(12) United States Patent
Kim et al.

(10) Patent No.: US 11,256,896 B2
(45) Date of Patent: Feb. 22, 2022

(54) ELECTRONIC DEVICE INCLUDING A SENSOR WHICH IS DISPOSED BELOW A DISPLAY

(71) Applicant: SAMSUNG ELECTRONICS CO., LTD., Suwon-si (KR)

(72) Inventors: Hyunwoo Kim, Suwon-si (KR); Jihoon Park, Suwon-si (KR); Jihun Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/029,570

(22) Filed: Sep. 23, 2020

(65) Prior Publication Data
US 2021/0097253 A1  Apr. 1, 2021

(30) Foreign Application Priority Data
Sep. 27, 2019 (KR) .......... 10-2019-0119275

(51) Int. Cl.
| | | |
|---|---|---|
| *G06K 9/00* | (2006.01) | |
| *G06F 1/16* | (2006.01) | |
| *H04B 1/3888* | (2015.01) | |
| *H05K 5/00* | (2006.01) | |
| *G06F 3/046* | (2006.01) | |

(52) U.S. Cl.
CPC ......... *G06K 9/0004* (2013.01); *G06F 1/1626* (2013.01); *H04B 1/3888* (2013.01); *H05K 5/0017* (2013.01); *G06F 3/046* (2013.01)

(58) Field of Classification Search
None
See application file for complete search history.

(56) References Cited

U.S. PATENT DOCUMENTS

| | | | |
|---|---|---|---|
| 9,119,311 B2* | 8/2015 | Yamanaka | ............ G06F 1/1656 |
| 9,870,033 B1 | 1/2018 | Browning et al. | |
| 9,996,725 B2 | 6/2018 | Oganesian | |
| 10,331,934 B2 | 6/2019 | Benkley, III et al. | |
| 10,452,937 B2 | 10/2019 | Jin et al. | |

(Continued)

FOREIGN PATENT DOCUMENTS

| | | |
|---|---|---|
| CN | 109446908 | 3/2019 |
| CN | 109634024 | 4/2019 |

(Continued)

OTHER PUBLICATIONS

International Search Report and Written Opinion dated Jan. 15, 2021 in corresponding International Application No. PCT/KR2020/012569.

(Continued)

*Primary Examiner* — Xanthia C Cunningham
(74) *Attorney, Agent, or Firm* — Nixon & Vanderhye, P.C.

(57) ABSTRACT

An portable communication device may include a display, a back panel that is disposed below the display, a support member that is disposed below the back panel, a sensor that is disposed such that at least a portion of the sensor faces a back surface of the display through a sensor hole formed at the support member, a first adhesive member that adheres at least a portion of the sensor on one side of the support member, and a second adhesive member that is disposed between the sensor (or a sensor structure including the sensor) and the sensor hole.

28 Claims, 15 Drawing Sheets

(56) References Cited

U.S. PATENT DOCUMENTS

| | | | |
|---|---|---|---|
| 10,488,891 B2 | 11/2019 | Browning et al. | |
| 10,489,629 B1 | 11/2019 | Jiang et al. | |
| 10,515,251 B2 | 12/2019 | Cai | |
| 10,565,425 B2 | 2/2020 | Cai | |
| 10,613,689 B2 | 4/2020 | Zhang et al. | |
| 10,671,829 B2 | 6/2020 | Lee et al. | |
| 10,691,917 B2 | 6/2020 | Jiang et al. | |
| 10,699,094 B2 | 6/2020 | Shim et al. | |
| 10,706,251 B2 | 7/2020 | Shim et al. | |
| 10,719,682 B2 | 7/2020 | Choi et al. | |
| 10,772,208 B2 * | 9/2020 | Lee | G06F 3/041 |
| 10,776,600 B2 | 9/2020 | Benkley, III et al. | |
| 10,824,840 B2 | 11/2020 | Song et al. | |
| 2013/0094184 A1 * | 4/2013 | Lee | G02F 1/133512 |
| | | | 362/97.1 |
| 2015/0102829 A1 | 4/2015 | Son et al. | |
| 2017/0146710 A1 * | 5/2017 | Jin | G02B 5/22 |
| 2017/0147852 A1 | 5/2017 | Benkley, III et al. | |
| 2017/0160766 A1 * | 6/2017 | Gupta | H01L 27/1214 |
| 2017/0364763 A1 | 12/2017 | Jin et al. | |
| 2017/0372123 A1 * | 12/2017 | Kim | G06F 3/044 |
| 2018/0012069 A1 * | 1/2018 | Chung | G06K 9/2036 |
| 2018/0089492 A1 | 3/2018 | Cai | |
| 2018/0121705 A1 | 5/2018 | Oganesian | |
| 2018/0204040 A1 * | 7/2018 | Kwon | G06F 1/1626 |
| 2018/0232554 A1 | 8/2018 | Benkley, III et al. | |
| 2018/0260602 A1 * | 9/2018 | He | A61B 5/1495 |
| 2018/0293420 A1 | 10/2018 | Kim et al. | |
| 2018/0321780 A1 * | 11/2018 | Park | G06F 3/041 |
| 2018/0365466 A1 | 12/2018 | Shim et al. | |
| 2018/0365472 A1 * | 12/2018 | Cai | G02B 13/0025 |
| 2019/0197281 A1 | 6/2019 | Choi et al. | |
| 2019/0205603 A1 | 7/2019 | Lee et al. | |
| 2019/0212840 A1 | 7/2019 | Zhang et al. | |
| 2019/0251320 A1 * | 8/2019 | Kim | G06K 9/0002 |
| 2019/0251325 A1 | 8/2019 | Park et al. | |
| 2019/0303640 A1 | 10/2019 | Song et al. | |
| 2020/0012835 A1 | 1/2020 | Jiang et al. | |
| 2020/0042040 A1 | 2/2020 | Browning et al. | |
| 2020/0117876 A1 | 4/2020 | Cai | |
| 2020/0242323 A1 | 7/2020 | Jiang et al. | |
| 2021/0042495 A1 | 2/2021 | Song et al. | |

FOREIGN PATENT DOCUMENTS

| | | |
|---|---|---|
| JP | 2019-516166 | 6/2019 |
| KR | 10-2013-0127739 | 11/2013 |
| KR | 10-2016-0071352 | 6/2016 |
| KR | 10-2017-0125778 | 11/2017 |
| KR | 10-2018-0044837 | 5/2018 |
| KR | 10-1855464 | 6/2018 |
| KR | 10-2018-0097997 | 9/2018 |
| KR | 10-2018-0116188 | 10/2018 |
| KR | 10-2019-0026024 | 3/2019 |
| KR | 10-1945633 | 4/2019 |
| KR | 10-2019-0098537 | 8/2019 |

OTHER PUBLICATIONS

Extended European Search Report and Written Opinion dated Feb. 23, 2021 in corresponding European Application No. 20197697.4.

* cited by examiner

ELECTRONIC DEVICE INCLUDING A SENSOR WHICH IS DISPOSED BELOW A DISPLAY

CROSS-REFERENCE TO RELATED APPLICATION(S)

This application is based on and claims priority to Korean Patent Application No. 10-2019-0119275, filed on Sep. 27, 2019, in the Korean Intellectual Property Office, the disclosure of which is incorporated by reference herein its entirety.

BACKGROUND

1. Field

The disclosure relates to an electronic device including a sensor.

2. Description of Related Art

A portable electronic device such as a smartphone may include various sensors. For example, the portable electronic device may include at least one of a proximity sensor, an illumination sensor, a proximity illumination sensor, and an image sensor. Also, the portable electronic devices may include a fingerprint sensor. Nowadays, at least one of the above sensors may be disposed within an electronic device for the purpose of enlarging a size of a display of the electronic device and forming the exterior smoothly.

The above information is presented as background information only to assist with an understanding of the disclosure. No determination has been made, and no assertion is made, as to whether any of the above might be applicable as prior art with regard to the disclosure.

SUMMARY

In the case where a sensor is disposed below a display included in an electronic device, an issue on an increase in thickness of the electronic device and an alignment state of the sensor need to be considered.

Certain aspects of the disclosure are to address at least the above-mentioned problems and/or disadvantages and to provide at least the advantages described below. Accordingly, an aspect of the disclosure is to provide an electronic device including a sensor disposed below a display, thus making it possible to maintain a slim shape while improving a reliability of the sensor by disposing the sensor accurately stably at a designed location in the process of disposing the sensor below the display, without increasing a thickness of the electronic device.

Various respective aspects and features of the disclosure are defined in the appended claims. Combinations of features from the dependent claims may be combined with features of the independent claims as appropriate and not merely as explicitly set out in the claims.

It is an aim of certain embodiments of the disclosure to solve, mitigate or obviate, at least partly, at least one of the problems and/or disadvantages associated with the prior art. Certain embodiments aim to provide at least one of the advantages described below.

In accordance with an aspect of the disclosure, an electronic device may include a display, a back panel that is disposed below the display, a support member that is disposed below the back panel, a sensor that is disposed such that at least a portion of the sensor faces a back surface of the display through a sensor hole formed at the support member, a first adhesive member that adheres at least a portion of the sensor on one side of the support member, and a second adhesive member that is disposed between the sensor and the sensor hole.

An example of the present disclosure may be a portable communication device comprising: a display; a panel (e.g. back panel) disposed below the display (e.g. on an opposite side of the display to a side of the display closest to a user's eye when viewing the display in use), the back panel including a first opening; a support member disposed below the back panel, the support member including a second opening that at least partially overlaps (or, in other words, connects) with the first opening, wherein the second opening includes a first portion having a first width, and a second portion provided below the first portion and having a second width greater than the first width; a sensor disposed in the first portion of the second opening and configured to receive light reflected by a portion of a user's body and passing through the display panel and the first opening of the back panel; and a substrate coupled to (or, in other words, arranged to support, directly or indirectly) the sensor and disposed in the second portion of the second opening. It will be appreciated that the term "below" may alternatively be interpreted as "beneath", and is relative to a direction in which the display is typically viewed, in use, so as to see images generated on the display (i.e. a direction such as one normal to the flat portion of the display). The terms "upper" and "lower" may also be interpreted as being terms applying to the relative positions of components/features of the device when the device is positioned with the flat surface portion of the display in a generally horizontal plane, for viewing from above.

Another example may be a portable communication device in accordance with any preceding example, or with any other example described herein, wherein the sensor is coupled to the substrate by an adhesive member (e.g. an adhesive tape, a body of adhesive material, an adhesive layer or film, or any other adhesive means).

Another example may be a portable communication device in accordance with any preceding example, or with any other example described herein, further comprising a gap formed between an inner side wall of the first portion and the sensor, wherein the gap is filled with an adhesive means (e.g. a body of, consisting of, or comprising adhesive material).

Another example may be a portable communication device in accordance with any preceding example, or with any other example described herein, further comprising a battery disposed below the support member, wherein at least portion of the battery is attached to at least portion of the support member by an adhesive film or tape (or by any other adhesive means).

Another example may be a portable communication device in accordance with any preceding example, or with any other example described herein, further comprising an adhesive film (or layer or tape or sheet) disposed between the support member (or a battery) and the substrate, wherein the adhesive film provides a function that at least a portion of the substrate is attached to the support member.

Another example may be a portable communication device in accordance with any preceding example, or with any other example described herein, wherein at least a portion of a lower surface of the substrate is above at least a portion of a surface (e.g. a lower surface, or a downward facing surface) of the support member.

Another example may be a portable communication device in accordance with any preceding example, or with any other example described herein, wherein at least a portion of a lower surface of the substrate is placed on a plane substantially identical to a surface (e.g. a lower surface, or a downward facing surface) of the support member. In other words, a lower flat surface of the substrate may be level with a surface of the support member.

Another example may be a portable communication device in accordance with any preceding example, or with any other example described herein, further comprising: an adhesive member disposed in at least a portion of a region between the support member and the substrate to adhere the substrate to the support member, wherein at least a portion of the adhesive member is placed in the second portion of the second opening.

Another example may be a portable communication device in accordance with any preceding example, or with any other example described herein, further comprising: a battery placed below the support member and the substrate.

Another example may be a portable communication device in accordance with any preceding example, or with any other example described herein, further comprising: an adhesive member placed in at least a portion of a region between the support member and the battery to adhere at least a portion of the battery to the support member.

Another example may be a portable communication device in accordance with any preceding example, or with any other example described herein, further comprising: a housing forming an exterior (e.g. forming at least a portion of an exterior) of the portable communication device, wherein the support member is connected (e.g. integrally connected) with the housing.

Another example may be a portable communication device in accordance with any preceding example, or with any other example described herein, further comprising: a communication circuit electrically connected with a conductive portion included in the housing.

Another example may be a portable communication device in accordance with any preceding example, or with any other example described herein, further comprising: a processor electrically connected with (e.g. operatively coupled to) the sensor; a printed circuit board disposed to be spaced from the sensor, wherein the processor is mounted on the printed circuit board; and a wire (or wiring) part (which may also be described as wiring or electrical connection means) including one side connected with the sensor and an opposite side connected with the processor through the printed circuit board.

Another example may be a portable communication device in accordance with any preceding example, or with any other example described herein, wherein the support member further includes: a wire hole (which may also be described as a hole, or wiring hole), wherein at least a portion of the wire part passes through the wire hole.

Another example may be a portable communication device in accordance with any preceding example, or with any other example described herein, wherein the support member comprises conductive material (e.g. comprises a conductive material).

Another example may be a portable communication device in accordance with any preceding example, or with any other example described herein, wherein the back panel comprises at least one layer.

Another example may be a portable communication device in accordance with any preceding example, or with any other example described herein, wherein the back panel comprises a plurality of layers.

Another example may be a portable communication device in accordance with any preceding example, or with any other example described herein, wherein the back panel comprises a plurality of layers, and wherein the plurality of layers includes at least two of: an embossed layer, a cushion layer, an electromagnetic induction layer, a heat radiation layer, a shielding layer, and an adhesive layer.

Another example may be a portable communication device in accordance with any preceding example, or with any other example described herein, wherein the first opening is stepped and comprises an upper portion and a lower portion, the lower portion being wider than the upper portion.

Another example may be a portable communication device in accordance with any preceding example, or with any other example described herein, wherein the second opening is stepped, widening from the first portion to the second portion at a step, the step providing a downward facing flat surface surrounding a lower mouth of the first portion.

Another example may be a portable communication device in accordance with the immediately preceding example, or with any other example described herein, wherein at least part of an upper surface of the substrate is seated on said flat surface.

Another example may be a portable communication device in accordance with the immediately preceding two examples, or with any other example described herein, further comprising adhesive means arranged to attach at least a portion of an upper surface of the substrate to at least a portion of said flat surface.

Another example may be a portable communication device in accordance with the immediately preceding example, or with any other example described herein, wherein the adhesive means comprises adhesive tape.

Another example may be a portable communication device in accordance with any preceding example, or with any other example described herein, wherein the substrate comprises a metal sheet.

Another example may be a portable communication device in accordance with any preceding example, or with any other example described herein, wherein said substrate is rectangular.

Another example may be a portable communication device in accordance with any preceding example, or with any other example described herein, wherein said second portion is rectangular.

Another example may be a portable communication device in accordance with any preceding example, or with any other example described herein, wherein said first portion is rectangular.

Another example may be a portable communication device in accordance with any preceding example, or with any other example described herein, wherein said sensor is an optical fingerprint sensor.

It will be appreciated that certain examples provide devices comprising a stepped hole in the support member, with the sensor substrate being accommodated in a wider portion of the stepped hole (e.g. in a recess in a lower surface of the support member), and the sensor substrate being located against a downward facing shoulder surface of the stepped hole, and below the sensor (or sensor array). This provides the technical effect of enabling the sensor to be disposed/located stably and accurately, and enables a thickness of the device to be kept small. Additionally, if the sensor is damaged, it can easily be replaced by detaching the substrate from the support member, without damaging the display above the back panel.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments (i.e. examples) of the disclosure will be more apparent from the following description taken in conjunction with the accompanying drawings, in which.

DETAILED DESCRIPTION

Figure 1:
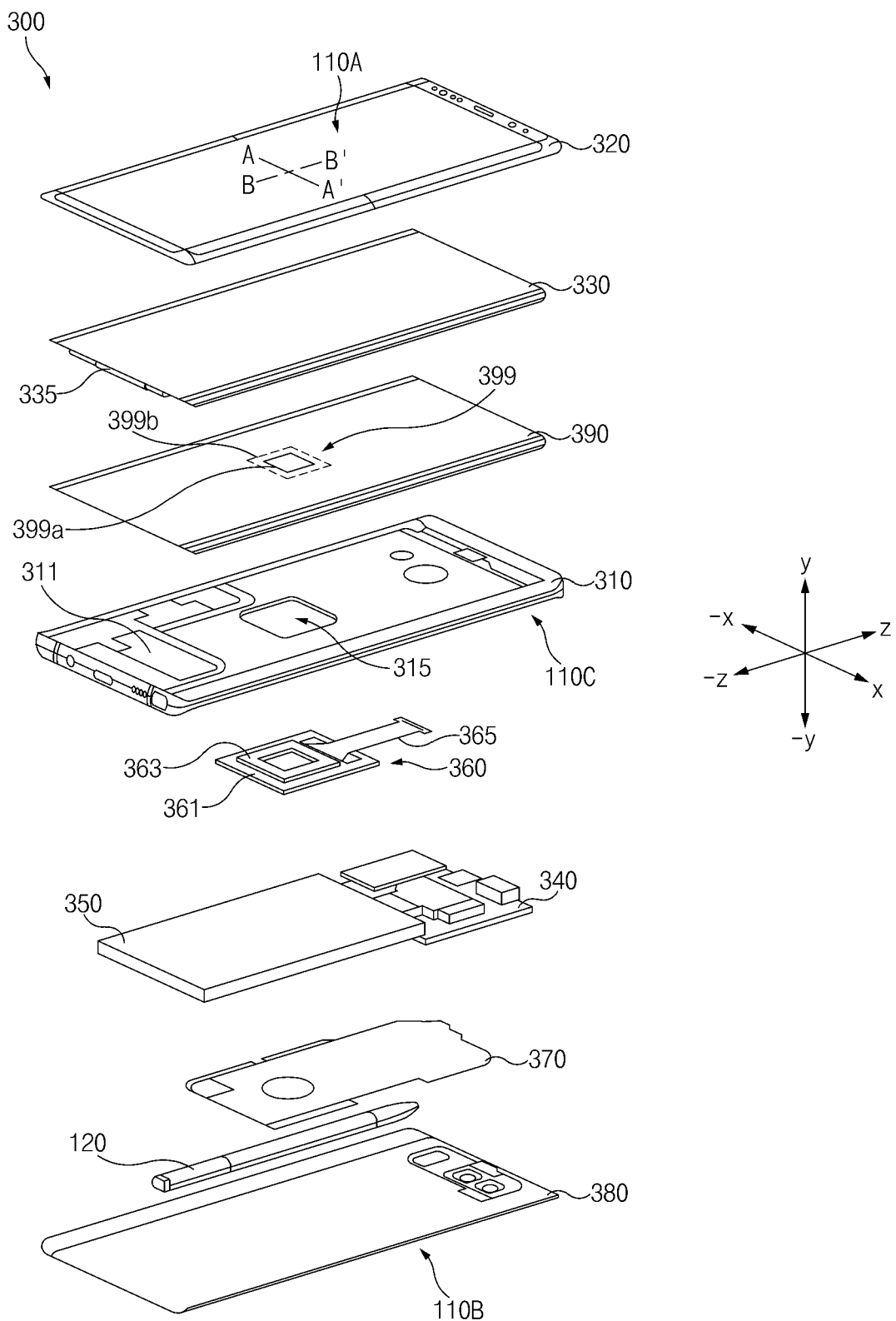
FIG. 1 is a view illustrating an example of an exploded perspective view of an electronic device according to various embodiments.

Hereinafter, various embodiments (i.e. examples) of the disclosure may be described with reference to accompanying drawings. Accordingly, those of ordinary skill in the art will recognize that modifications, equivalents, and/or alternatives on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a view illustrating an example of an exploded perspective view of an electronic device according to various embodiments.

Referring to FIG. 1, an electronic device 300 may include a front plate 320, a display 330 (or display panel), a back panel 390 (or a panel, a back layer, a back sheet, or sheet layer), a support member 310 (or, a bracket, a front, at least a part of a housing, a frame), a sensor structure 360, a printed circuit board 340, a battery 350, an antenna structure 370, a pen input device 120, and a back plate 380 (or a back cover or an antenna pad). In an embodiment, the electronic device 300 may not include at least one (e.g., at least a portion of the back panel 390, the pen input device 120, or at least a portion of the antenna structure 370) of the components or may further include any other component.

A first surface 110A may be formed by the front plate 320 (e.g., a glass plate including various coating layers, or a polymer plate), of which at least a portion is substantially transparent. A second surface 110B may be formed by the back plate 380 that is substantially opaque. For example, the back plate 380 may be implemented with a coated or colored glass, a ceramic, a polymer, a metal (e.g., aluminum, stainless steel (STS), or magnesium), or a combination of at least two of the above materials. At least a portion of the support member 310 may form at least a portion of a side surface 110C of the electronic device 300. According to various embodiments, at least a portion of the side surface 110C may include a curved portion of an edge of the front plate 320 and the display 330 and a curved portion of an edge of the back plate 380, and the curved portions may have given curvatures.

The display 330 may include a plurality of pixels associated with displaying a screen. According to an embodiment, the plurality of pixels may be arranged in the form of a matrix. The printed circuit board 335 (or a flexible printed circuit board) may be disposed with regard to driving the display 330. At least a portion of the printed circuit board 335 may be disposed on a back surface (e.g., a surface facing away from a surface on which a screen is displayed, that is, a surface facing a second direction (a negative direction of the y-axis)) of the display 330. According to an embodiment, a display driver integrated circuit (DDI) may be disposed on the printed circuit board 335 with regard to (or, in other words, for) driving the display 330. At least one sensor structure 360 (e.g., a structure including a fingerprint sensor) may be disposed on at least one side of the back surface of the display 330. In this case, the printed circuit board 335 may include an opening (a hole or a recess, or an opening smaller in size than the sensor structure 360) of a size corresponding to a size of the sensor structure 360 such that the sensor structure 360 is capable of collecting a light (or a signal) through the back surface of the display 330. According to an embodiment, the sensor structure 360 may be disposed at at least a portion of the printed circuit board 335. The sensor structure 360 may obtain at least a portion of a light transferred through an opening 399 of the back panel 390 and may obtain information corresponding to a fingerprint based on the obtained light. According to an embodiment, the display 330 may include a panel layer where at least one pixel used to display a screen is disposed, a touch screen panel associated with sensing a touch, a polarizer, and an adhesive layer. At least a portion of the back panel 390 that is disposed on the back surface of the display 330 may be removed such that a light emitted from the pixel of the display 330 is reflected by a finger surface and is then transferred to the sensor structure 360.

The back panel 390 may include at least one layer that is disposed on the back surface of the display 330. For example, the back panel 390 may include at least one of a cushion layer and a heat radiation layer that are disposed on the back surface of the display 330. Alternatively, the back panel 390 may include at least one of an embossing (or, in other words, embossed) layer, a cushion layer, an adhesive layer, an electromagnetic induction panel, a heat radiation layer, and a heat radiation adhesive layer. At least a part of the layers of the back panel 390 described above may be removed, or a part thereof may be partially removed. Also, an adhesive layer may be further disposed between the layers of the back panel 390. For example, the adhesive layer may be further disposed between the embossing (embossed) layer and the back surface of the display 330 or between the display 330 and the cushion layer.

The electromagnetic induction panel (e.g., a digitizer) of the back panel 390 may be a panel for sensing an input of the pen input device 120. For example, the electronic device 300 may include the electromagnetic induction panel capable of sensing an input by a digital pen, which is in contact with or adjacent to at least a portion of the display 330, in an electromagnetic induction scheme. According to an embodiment, a capacitive scheme may be used as a technology for recognizing the digital pen. In the case of the capacitive scheme, an input may be recognized by sensing a variation that occurs when a conductor (e.g., a digital pen) contacts a display to which a current is uniformly applied. The digital pen may be classified as an electromagnetic resonance (EMR) digital pen using an electromagnetic resonance scheme or an active electrostatic solution (AES) digital pen using an active electrostatic scheme. For example, in the case of the digital pen of the EMR scheme, a separate panel called "digitizer" may be disposed within a display, and an electronic device may recognize a location of the digital pen by using a coil of the digital pen, through which a current flows and a wireless frequency. For example, when an electromagnetic signal generated by the digitizer is transferred to the digital pen, and the digital pen may sense the electromagnetic signal and may transfer energy transmitted to the digital pen as a signal including a resonant frequency through an internal circuit of the digital pen. As such, the intensity of the signal may be measured. In the case of the pen of the AES scheme, the pen itself may include an electromagnetic signal generating device and may operate without a separate digitizer. As described above, because the digitizer is sensitive to an electromagnetic field and a noise, the digitizer may require a shielding sheet for blocking an interference of an internal or external noise or an electromagnetic field. For example, the back panel 390 may include a shielding sheet that is disposed below a printed circuit board (PCB) (e.g., a flexible printed circuit board (FPCB)) and an electromagnetic induction panel. The shielding sheet may prevent a mutual interference between components due to an electromagnetic field generated from components (e.g., a display module, a printed circuit board, an electromagnetic induction panel, and the like) included in the electronic device 300. As the shielding sheet blocks the electromagnetic field generated from the components, an input from the pen input device 120 may be accurately transferred to the back panel 390. In the case where the electronic device 300 does not support the pen input device 120, the electromagnetic induction panel may be omitted, and thus, the shielding sheet may also be omitted.

The opening 399 may be formed at a region of the back panel 390, in which the sensor structure 360 is disposed. The opening 399 may be provided to penetrate the back panel 390 vertically (from a y-axis to a negative y-axis). A top and a bottom of the opening 399 defined at the back panel 390 may be formed with the same size. Alternatively, in the case where the back panel 390 is formed of a plurality of layers, the opening 399 may include a first opening 399a (or a first hole) formed at some layers and a second opening 399b formed at the remaining layers. The first opening 399a and the second opening 399b may be disposed to at least partially overlap each other. In other words, the first opening and second opening may be connected. They may be aligned so as to communicate with each other. They may, for example, be aligned such that a perimeter of the first opening lies within a perimeter of the second opening when viewed in a direction parallel to the nominal y axis in the accompanying figures. The first opening 399a and the second opening 399b may be identical in size. According to various embodiments, the first opening 399a formed to be closer to the display 330 may be smaller in size than the second opening 399b formed at a different layer, with regard to improvement of visibility (and/or to improve the appearance of the device). A shape of the opening 399 may be provided to correspond to a shape of the sensor structure 360. For example, in the case where the sensor structure 360 is formed in the shape of a quadrangle, the opening 399 may be formed in the shape of a quadrangle. The description is given above as the opening 399 includes the first and second openings 399a and 399b having different sizes, but the present disclosure is not limited thereto. For example, the back panel 390 may include only one opening and a size of a upper part of the opening is the same with a size of a lower part of the opening.

According to an embodiment, the sensor structure 360 may include a support substrate 361, a sensor 363, and a wire part 365.

The support substrate 361 (or substrate) may have a specified size and a specified thickness and may support the sensor 363 placed thereon. The sensor 363 may be coupled to the support substrate 361 by an adhesive member. The support substrate 361 may be formed to be larger in size than one surface (e.g., an upper surface or a lower surface) of the sensor 363. The remaining region of the support substrate 361 other than a region where the sensor 363 is placed may be adhered to one surface (e.g., a lower surface) of the support member 310. An adhesive member including an adhesive or an adhesive tape may be disposed at at least a portion of the upper surface of the support substrate 361 and may perform a role of first (or initially) fixing the sensor 363 on one side of a back surface of the support member 310. The support substrate 361 may be in the shape of at least one of a film or a metal sheet having a given rigidity for adhesion on the support member 310. According to various embodiments, at least a portion of the support substrate 361 may be formed to include a magnet metal powder (MMP) blocking a noise. According to various embodiments, at least a portion of the support substrate 361 may include a region having an adhesive function and a region having a given rigidity or hardness capable of supporting a sensor. A portion of the wire part 365, which is connected with the sensor 363, may be placed on the support substrate 361.

The sensor 363 may collect a light that is reflected by a user's fingerprint contacting a front surface (e.g., a surface (e.g., the first surface 110A) viewed in a first direction (or a y-axis direction)) of the display 330 after a light is emitted from at least one of a plurality of pixels disposed in the display 330. Alternatively, the sensor 363 may include a light emitting unit to emit a light (or a signal) in the first direction (or the y-axis direction) (or a direction facing the front surface of the display 330), and a light receiving unit to collect a reflected light (or signal) after a light is emitted. According to an embodiment, the sensor 363 may include a sensor that obtains a light signal reflected by a portion of a user's body contacting the front surface of the display 330 and obtains information corresponding to a fingerprint of the user. According to various embodiments, the sensor 363 may include an ultrasonic sensor. In the case where the sensor 363 is implemented with an ultrasonic sensor, at least a portion of a space between an upper surface (e.g., a surface facing the y-axis direction) of the sensor 363 and the back surface (e.g., a surface facing the negative direction of the y-axis) of the display 330 may be filled with a layer formed of a specified material (e.g., an optical material layer or a layer formed of a material capable of transferring an ultrasonic signal like an optical layer). The sensor 363 may be disposed such that at least a portion of the sensor 363 is exposed through a sensor hole 315 (or a first portion, a part of a second opening or a part of a second hole) disposed at the support member 310. According to an embodiment, as at least a portion of the sensor 363 is inserted and disposed in the sensor hole 315, at least a portion of a side surface of the sensor 363 may be disposed parallel to a portion of the support member 310, which is around (or surrounds) the sensor hole 315. At least a portion of the sensor 363 may collect a light incident from the outside through the opening 399 formed at the back panel 390. Substantially, as the back panel 390 is disposed on the back surface of the display 330, at least a portion of the upper surface of the sensor 363 may be disposed to face the back surface of the display 330 through the opening 399 of the back panel 390. An adhesive member may be disposed at at least a portion of a space between the sensor 363 and the sensor hole 315 to stably fix the sensor 363 to the support member 310. According to various embodiments, the sensor 363 may include at least one of an image sensor (or a camera) capable of photographing an image, a biometric sensor collecting biometric information of the user (e.g., a fingerprint sensor supporting a fingerprint sensing function or a heartbeat sensor), and an ultrasonic sensor.

The wire part 365 may be electrically connected with the sensor 363 and may transfer at least a part of signals collected by the sensor 363 to a processor (e.g., at least one electrical element mounted on the printed circuit board 340) of the electronic device 300. At least a portion of the wire part 365 may be implemented with, for example, a flexible printed circuit board.

At least a portion of the support member 310 may be formed of a metal material and may form a side surface of the electronic device 300. The support member 310 may be provided by processing a metal plate. At least a portion of the support member 310 may perform a role of an antenna associated with a wireless communication function of the electronic device 300. An inner support member 311 may be disposed on one side of the support member 310. The inner support member 311 may be a portion of the support member 310 or may be integrated with the support member 310 while being formed through separate injection-molding. The inner support member 311 may be disposed within the electronic device 300 so as to be connected with the support member 310 or may be integrally formed with the support member 310. The inner support member 311 and the support member 310 may be belonging to one body. In other words, the inner support member 311 and the support member 310 may be integral parts of a body (e.g. a single, common body). The inner support member 311 may be formed of, for example, a metal material and/or a nonmetal material (e.g., a polymer, a magnesium material, or an alloy). The display 330 may be coupled to one surface (e.g., a surface facing the first direction (or the y-axis direction)) of the inner support member 311, and the battery 350 and the printed circuit board 340 may be disposed toward (or on) an opposite surface (e.g., a surface facing the second direction (or the negative direction of the y-axis)) thereof. The inner support member 311 may be provided in the shape of being integrated with the support member 310 or may be formed together when the support member 310 is formed. Below, the description will be given with reference to the shape where the inner support member 311 is integrated with the support member 310.

An electrical element may be mounted on the printed circuit board 340. The electrical element may include, for example, a processor, a memory, and/or an interface. The processor may include, for example, one or more of a central processing unit, an application processor, a graphic processing device, an image signal processor, a sensor hub processor, or a communication processor. The memory may include, for example, a volatile memory or a nonvolatile memory. The interface may include, for example, a high definition multimedia interface (HDMI), a universal serial bus (USB) interface, a secure digital (SD) card interface, and/or an audio interface. The interface may electrically or physically connect, for example, the electronic device 300 with an external electronic device and may include a USB connector, an SD card/MMC connector, or an audio connector.

The battery 350 may be a device for supplying a power to at least one component of the electronic device 300, and at least a portion of the battery 350 may be disposed, for example, on substantially the same surface as the printed circuit board 340 or may be disposed on at least one side of the printed circuit board 340. The battery 350 may be integrally disposed within the electronic device 300 (or not be able to be removable from the electronic device 300) or may be disposed to be removable from the electronic device 300. The battery 350 may be seated at a battery seating part formed at the support member 310. In this regard, the battery seating part corresponding to a battery shape may be formed at the support member 310. At least a portion of the sensor structure 360 may be disposed above the battery 350 (e.g., in the y-axis direction). According to an embodiment, the sensor 363 of the sensor structure 360 or at least a portion of the support substrate 361 supporting the sensor 363 may be disposed above the battery 350.

At least one antenna structure 370 may be disposed between the back plate 380 and the battery 350. According to an embodiment, the antenna structure 370 may include at least one of at least one antenna, an antenna pattern, an opening, a bonding part, an antenna pad, or an antenna connection part. For example, the antenna of the antenna structure 370 may include at least one of a near field communication (NFC) antenna, an antenna for wireless charging, and/or a magnetic secure transmission (MST) antenna. The antenna structure 370 may perform, for example, short range communication with an external device or may wirelessly transmit/receive power necessary to charge (i.e. power required for charging). In another embodiment, an antenna structure may be implemented with a portion of the support member 310 and/or the inner support member 311 or with a combination thereof. The antenna structure 370 may be omitted depending on a kind of an antenna or a design change of the electronic device 300.

Meanwhile, a structure in which the electronic device 300 includes the back panel 390 and the pen input device 120 is described above, but the present disclosure is not limited thereto. For example, the electronic device 300 may not include components such as at least a part (e.g., a digitizer) of the back panel 390 and the pen input device 120.

Figure 2:
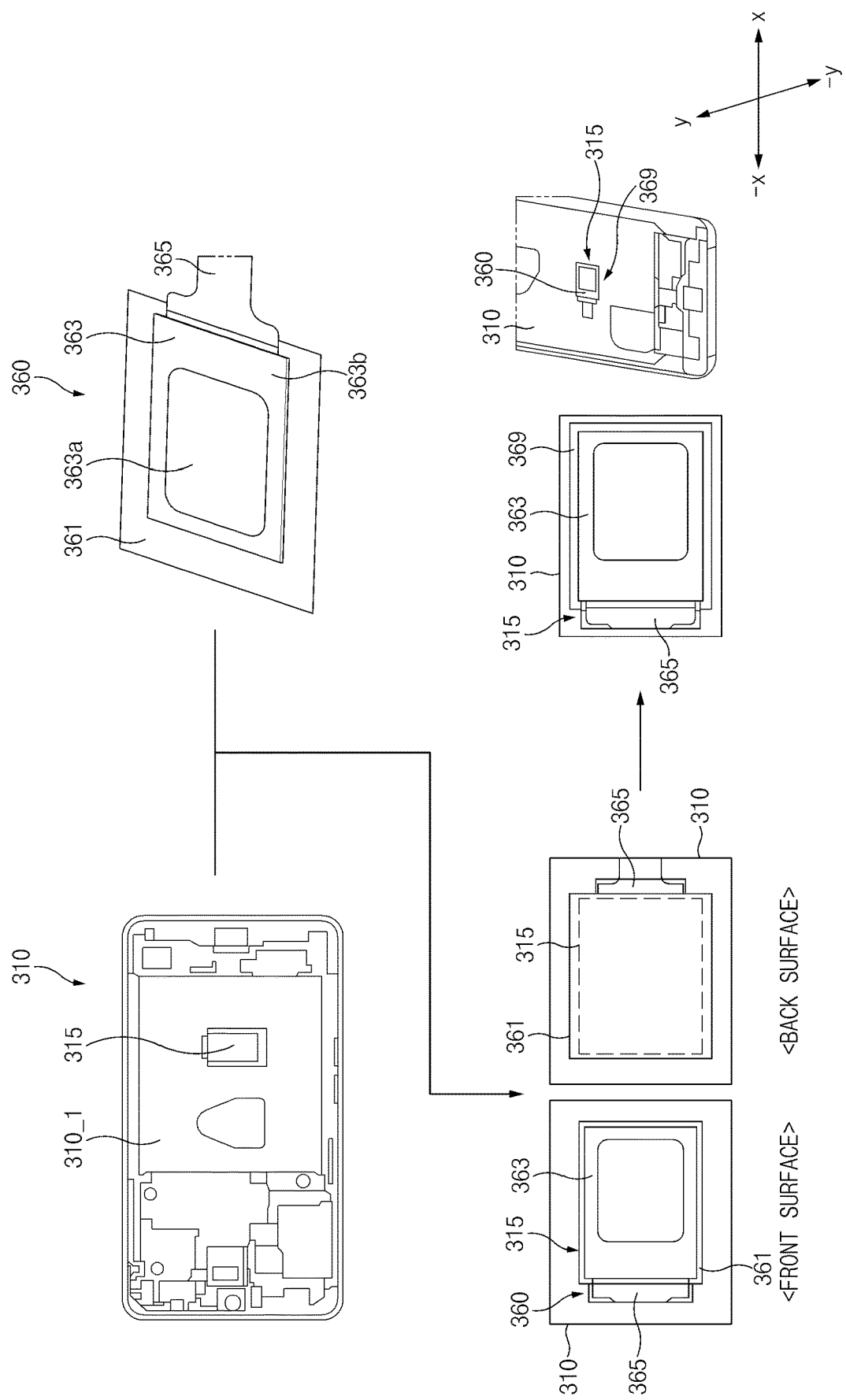
FIG. 2 is a view illustrating an example of a support member and a sensor structure among components of an electronic device according to an embodiment.

FIG. 2 is a view illustrating an example of a support member and a sensor structure among components of an electronic device according to an embodiment.

Referring to FIG. 2, the electronic device 300 according to an embodiment may include the support member 310, in which the sensor hole 315 is formed by removing at least a portion of a central region thereof, and the sensor structure 360, at least a portion of which is exposed through the sensor hole 315 of the support member 310.

As illustrated, the support member 310 may be provided in the shape of a rectangle (or quadrangle) on the whole, and the sensor hole 315 may be formed to penetrate front and back surfaces of at least a portion of a first support member 310_1 where the battery 350 is disposed. The first support member 310_1 may be provided in a shape corresponding to a size of a battery. The sensor hole 315 may be formed to be smaller in size than the whole of the sensor structure 360. According to an embodiment, at least a portion of the sensor hole 315 may be provided in a shape corresponding to a shape of the sensor 363 included in the sensor structure 360.

The sensor structure 360 may include the support substrate 361 of a given size, the sensor 363 placed on the support substrate 361, and the wire part 365 connected with the sensor 363. The sensor 363 may include a sensing unit 363*a* to collect a light transferred from the outside, and a mold part 363*b* disposed around (or to surround) the sensing unit 363*a*. At least a portion of the sensing unit 363*a* may be implemented with a semiconductor device to collect an external light. A substrate may be disposed at the sensing unit 363*a* and at least a portion of a lower surface of the mold part 363*b*, and a sensor array (e.g., elements for converting a light signal) where the collected light is stored may be disposed at the substrate. At least a portion of the wire part 365 may be electrically connected with the sensor array.

At least a portion of an outer region (e.g., the remaining region other than a region where the sensor 363 is disposed) of an upper surface of the support substrate 361 may contact one surface (e.g., a back surface or a front surface) of the support member 310. At least a portion of the support substrate 361 may be formed of an adhesive member, or an adhesive member may be disposed on at least one side of the upper surface of the support substrate 361. As such, at least a portion of an outer portion of the support substrate 361 may be fixed to one surface (e.g., one side of a front surface or one side of a back surface) of the support member 310. When viewed from above the front surface of the support member 310 (e.g., the y-axis direction), as the support substrate 361 is adhered to the back surface of the support member 310, at least a portion of the sensor 363 may be exposed toward the front surface of the sensor hole 315 (i.e., in the y-axis direction). Alternatively, at least a portion of the sensor 363 may be disposed in the sensor hole 315. A portion of the wire part 365, which is electrically connected with the sensor 363, may be exposed through the sensor hole 315, and the remaining portion thereof may be disposed on the back surface of the support member 310. When viewed from above the back surface of the support member 310 (i.e., in the negative direction of the y-axis), a shape where the support substrate 361 closes (or covers) at least a portion of the sensor hole 315 of the support member 310 may be observed. The wire part 365 may be observed on one side of the support substrate 361.

The support substrate 361 may first fix the sensor 363 in the sensor hole 315 such that at least a portion of the sensor 363 is disposed in at least a portion of the sensor hole 315, and a second adhesive member 369 may be formed around the sensor 363 for the purpose of fixing the sensor 363 to the support member 310. The second adhesive member 369 may be disposed at at least a portion of a peripheral part of the sensor hole 315. According to an embodiment, the second adhesive member 369 may be disposed between the sensor 363 and the sensor hole 315 (e.g., on at least three of four sides of the sensor 363), except for one side where the wire part 365 connected with the sensor 363 is disposed. According to various embodiments, the second adhesive member 369 may be formed to close (or cover) the whole of the sensor hole 315 (e.g., three surfaces of the sensor 363, and one surface between the wire part 365 and the sensor hole 315).

Figure 3:
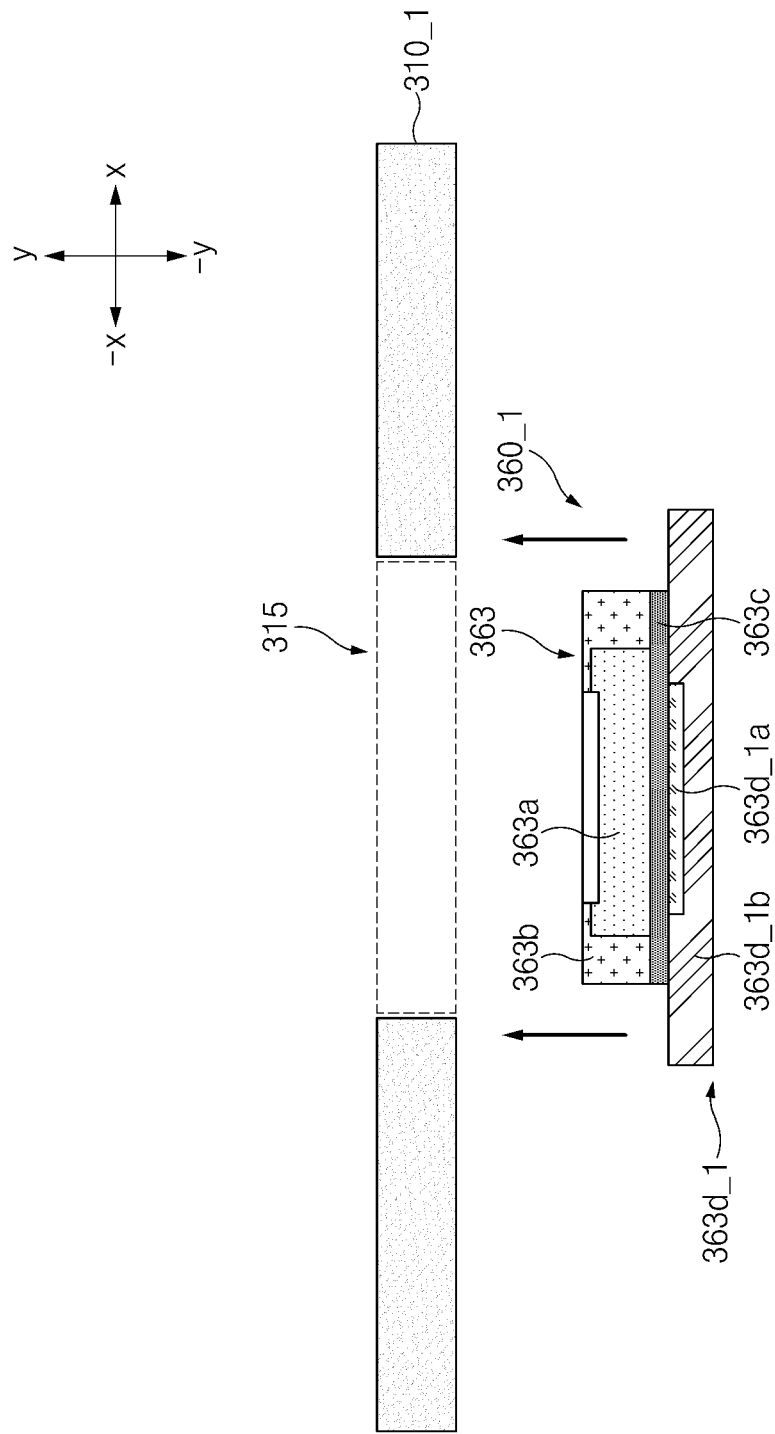
FIG. 3 is a view illustrating a state where a support member and a sensor structure among components of an electronic device according to an embodiment are not coupled.
Figure 4:
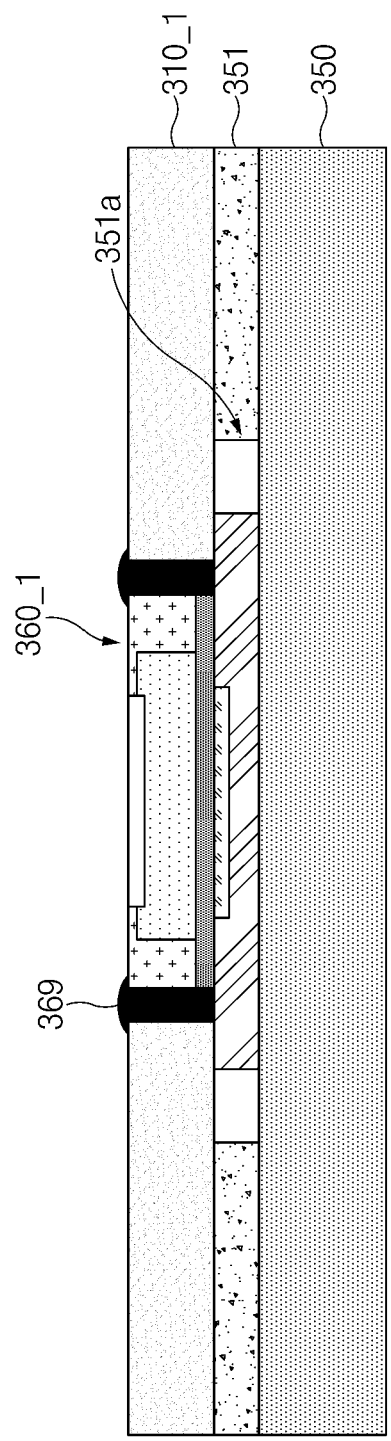
FIG. 4 is a view illustrating a state where a support member and a sensor structure among components of an electronic device according to an embodiment are coupled.

FIG. 3 is a view illustrating a state where a support member and a sensor structure among components of an electronic device according to an embodiment are not coupled, and FIG. 4 is a view illustrating a state where a support member and a sensor structure among components of an electronic device according to an embodiment are coupled.

Referring to FIG. 3, the first support member 310_1 may include the sensor hole 315 of a given size. The sensor hole 315 may be formed to penetrate the front and back surfaces of the first support member 310_1. The size of the sensor hole 315 may correspond to a size of the sensor 363 disposed at a first sensor structure 360_1. Alternatively, the size of the sensor hole 315 may be larger than a size of one surface of the sensor 363 as much as (i.e. by) a specified magnitude, and the sensor hole 315 may be formed such that the sensor 363 is capable of being penetrated. The sensor hole 315 may be a hole that is identical or similar in shape to the sensor hole 315 described with reference to FIGS. 1 and 2 above. At least a portion of the first sensor structure 360_1 may be disposed below (or may be adhered or coupled to) the first support member 310_1. The first sensor structure 360_1 may include the sensor 363 including the sensing unit 363a, the mold part 363b, and a substrate 363c, and a first support substrate 363d_1 on which the sensor 363 is placed.

At least a portion of the first support substrate 363d_1 may include a shielding part 363d_1a and a support 363d_1b. The shielding part 363d_1a may prevent a noise generated at the display 330 and the electromagnetic induction panel (or a digitizer) from being transferred in a given direction (e.g., in a downward direction from a layer in which the electromagnetic induction panel is present or from the y-axis to the negative y-axis). The shielding part 363d_1a may be formed of, for example, a magnet metal powder (MMP). A size of the shielding part 363d_1a may correspond to the size of the sensor hole 315 or may correspond to the size of the opening 399 formed at the back panel 390. According to various embodiments, in the case where the electromagnetic induction panel is included in a back panel (e.g., 390 of FIG. 1) and the electromagnetic induction panel includes a first opening (e.g., 399a of FIG. 1), the shielding part 363d_1a may have a size (e.g., a size similar to that of the first opening 399a within the same or given ratio) corresponding to a size of the first opening 399a with regard to blocking a noise generated at the electromagnetic induction panel. The support 363d_1b may be disposed to surround the shielding part 363d_1a. At least a portion of the support 363d_1b may support the substrate 363c of the sensor 363. The support 363d_1b may be formed to be larger in size than the substrate 363c. The support 363d_1b may be formed by mixing an adhesive material and an MMP at a given ratio (e.g., 80:20) or attaching an adhesive film and an MMP sheet. At least a portion of the remaining region of the support 363d_1b, in which the substrate 363c is not disposed, may be adhered to a portion of the back surface (e.g., a surface facing the negative direction of the y-axis) of the first support member 310_1, which surrounds the sensor hole 315.

Referring to FIG. 4, in the case where at least a portion of a sensor such as a biometric sensor (e.g., 363 of FIG. 3) is disposed in a sensor hole (e.g., 315 of FIG. 3), a portion of a support (e.g., 363d_1b of FIG. 3) supporting the sensor 363 may be adhered to a portion of the back surface of the first support member 310_1, which surrounds the sensor 363. In the case where the sensor hole 315 is formed to be larger in size than one surface (e.g., an upper surface) of the sensor 363, when the sensor 363 is disposed in the sensor hole 315, a gap of a given size may be formed between a side surface of the sensor 363 and an inner side wall of the sensor hole 315. At least a portion of the second adhesive member 369 may be disposed in the gap. The second adhesive member 369 may include a liquid-type adhesive. Alternatively, the second adhesive member 369 may be an adhesive material that is solidified through post-processing (e.g., additional processing such as UV irradiation or heating) as a liquid-type adhesive. For example, the second adhesive member 369 may include epoxy or UV curing resin. According to various embodiments, the second adhesive member 369 may include an adhesive material that is capable of being solidified through additional processing in which the adhesive material self-cures as a specified time elapse at a normal condition (e.g., a room temperature) (e.g., in which the adhesive material cures by air at a specified temperature and humidity condition).

In the electronic device 300 described above, a first support substrate (e.g., 363d_1 of FIG. 3) that is disposed below the sensor 363 may be first attached to a portion of the first support member 310_1, which surrounds the sensor hole 315. In this case, at least a portion of the first support substrate may be formed of an adhesive member, or the first support substrate may include a first adhesive member separately. Afterwards, as the second adhesive member 369 is disposed between at least a portion of the sensor hole 315 and at least a portion of the sensor 363, the sensor 363 may be stably fixed to the first support member 310_1. This structure may make it possible to easily fix the sensor 363 in the sensor hole 315 and may provide a stable fixing structure. In the case of an optical sensor in which alignment of the sensor 363 with the opening 399 of the back panel 390 on the back surface of the display 330 is important, the alignment may be made accurately with high reliability through the above procedure.

Figure 5:
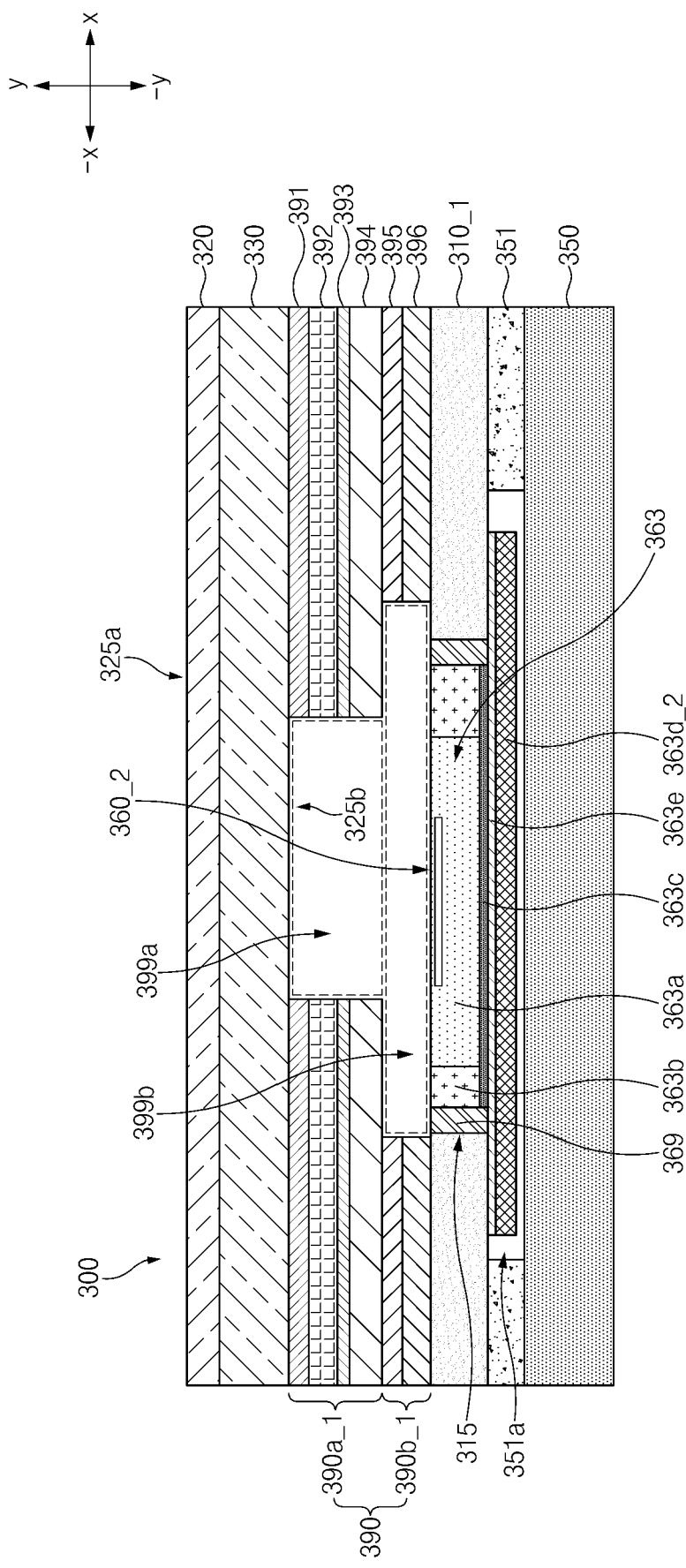
FIG. 5 is a cross-sectional view illustrating a portion of a configuration of an electronic device taken along line A-A' of FIG. 1.

FIG. 5 is a cross-sectional view illustrating a portion of a configuration of an electronic device taken along line A-A' of FIG. 1.

Referring to FIG. 5, a configuration of an electronic device according to an embodiment may include the front plate 320, the display 330, the back panel 390, the first support member 310_1, a second sensor structure 360_2, and the battery 350. The front plate 320 and the display 330 may be components that are substantially identical or similar to the front plate 320 and the display 330 described above with reference to FIG. 1. In addition, the electronic device may further include a back plate.

The back panel 390 may be disposed below the display 330. The back panel 390 may include a first group layer 390a_1 including at least one layer, and a second group layer 390b_1 including at least one layer. The first group layer 390a_1 may include, for example, an embossing layer 391, a cushion layer 392, an adhesive layer 393, and an electromagnetic induction panel 394 (or a digitizer). The second group layer 390b_1 may include a heat radiation layer 395 and a heat radiation adhesive layer 396. The first opening 399a may be formed at the first group layer 390a_1, and the second opening 399b may be formed at the second group layer 390b_1. The first opening 399a and the second opening 399b may be at least partially connected. The second opening 399b may be larger in size than the first opening 399a. The electromagnetic induction panel 394 may be necessary to support an operation of the pen input device 120; in this regard, as the size of the first opening 399a decreases, it may be more advantageous to operate the pen input device 120. Also, because the first opening 399a is not viewed from the outside as the first opening 399a decreases, the visibility may be improved. In other words, the visibility of the first opening may decrease as the size of the first opening is decreased, hence the appearance of the device may be improved. The second opening 399b may have a size corresponding to a size of the sensor hole 315 formed at the first support member 310_1. According to various embodiments, at least a portion of the sensor 363 of the second sensor structure 360_2 may be disposed in the second opening 399b. In this regard, the second opening 399b may be formed to correspond to the size of the sensor hole 315, and thus, a portion of the sensor 363, which protrudes from a front surface of the first support member 310_1, may be disposed (not to overlap) in the second opening 399b of the back panel 390. In addition, an additional adhesive layer(s) for adhesion may be further disposed between at least two or more layers included in the back panel 390 (e.g., on a top or bottom surface of layers disposed below a display). A width of the front plate 320, the display 330, the first opening 399a, or the second opening 399b may be designed according to a focal length of the sensor 363. Alternatively, the focal length of the sensor 363 may be determined to correspond to a height of all of the front plate 320, the display 330, the first opening 399a, and the second opening 399b. With regard to adjustment of the focal length, the sensor 363 may further include at least one lens and a fixing structure (e.g., an adhesive material) for fixing the lens.

As described above, the first support member 310_1 may include the sensor hole 315 in which at least a portion of the second sensor structure 360_2, for example, the sensor 363 is capable of being seated. The sensor hole 315 of the first support member 310_1 may be disposed to correspond to the first opening 399a and the second opening 399b. At least a portion of a first adhesive member 363e included in the second sensor structure 360_2 may be adhered to a portion of a back surface (e.g., a surface facing the negative direction of the y-axis) of the first support member 310_1, which surrounds the sensor hole 315; the second adhesive member 369 may be formed between the first support member 310_1 and the sensor 363. The first adhesive member 363e may be disposed, for example, on an entire upper surface (e.g., a surface facing the y-axis direction) of a second support substrate 363d_2. As such, the substrate 363c of the sensor 363 may be disposed at a central portion of the second support substrate 363d_2, and a portion of the first adhesive member 363e disposed an outer portion of the second support substrate 363d_2 may be disposed to be exposed to the outside. The second support substrate 363d_2 may be disposed to vertically (from a y-axis to a negative y-axis) overlap the portion of the back surface of the first support member 310_1, which surrounds the sensor hole 315. In this case, the second support substrate 363d_2 may be adhered to the back surface of the first support member 310_1 by the first adhesive member 363e placed on the second support substrate 363d_2.

The sensor 363 may include the sensing unit 363a, the mold part 363b, and the substrate 363c. The sensing unit 363a may be disposed on the center of the mold part 363b, and the substrate 363c may be disposed below the sensing unit 363a and the mold part 363b. The second adhesive member 369 may be formed at at least a portion of a space between the mold part 363b and an inner side wall of the sensor hole 315.

The second adhesive member 369 may be disposed to fill a gap between the sensor hole 315 and the sensor 363 after the second sensor structure 360_2 is adhered to the back surface of the first support member 310_1 by the first adhesive member 363e such that the sensor 363 is seated in the sensor hole 315. The second adhesive member 369 may be formed of a liquid-type adhesive; in this case, the liquid-type adhesive may be applied in the gap between the sensor hole 315 and the sensor 363 and may then cure through specified processing (e.g., UV irradiation or heating).

The battery 350 may be disposed below the first support member 310_1. A battery tape 351 may be disposed between the battery 350 and the first support member 310_1. The battery tape 351 may be formed of, for example, a double-sided adhesive tape. A battery hole 351a may be formed by removing at least a part of the battery tape 351. At least a portion of the second sensor structure 360_2, for example, the second support substrate 363d_2 or at least a portion of the first adhesive member 363e and the second support substrate 363d_2 may be disposed in the battery hole 351a. In this regard, the battery hole 351a may be larger in size than the second support substrate 363d_2. The second support substrate 363d_2 may be formed, for example, in the shape of a film. One surface (e.g., a surface facing the negative direction of the y-axis) of the second support substrate 363d_2 and one surface (e.g., a surface facing the y-axis direction) of the battery 350 may face each other through the battery hole 351a.

According to the electronic device 300 of the above structure, a light that is emitted from a pixel of the display 330 in the y-axis direction may be reflected in the negative direction of the y-axis by a fingerprint of a finger contacting an upper surface 325a of the front plate 320, may pass through the front plate 320 and the display 330, and may be transferred to the sensing unit 363a of the sensor 363 through the first opening 399a and the second opening 399b. The sensing unit 363a may be disposed to face a back surface 325b of the display 330 through the second opening 399b and the first opening 399a.

Figure 6:
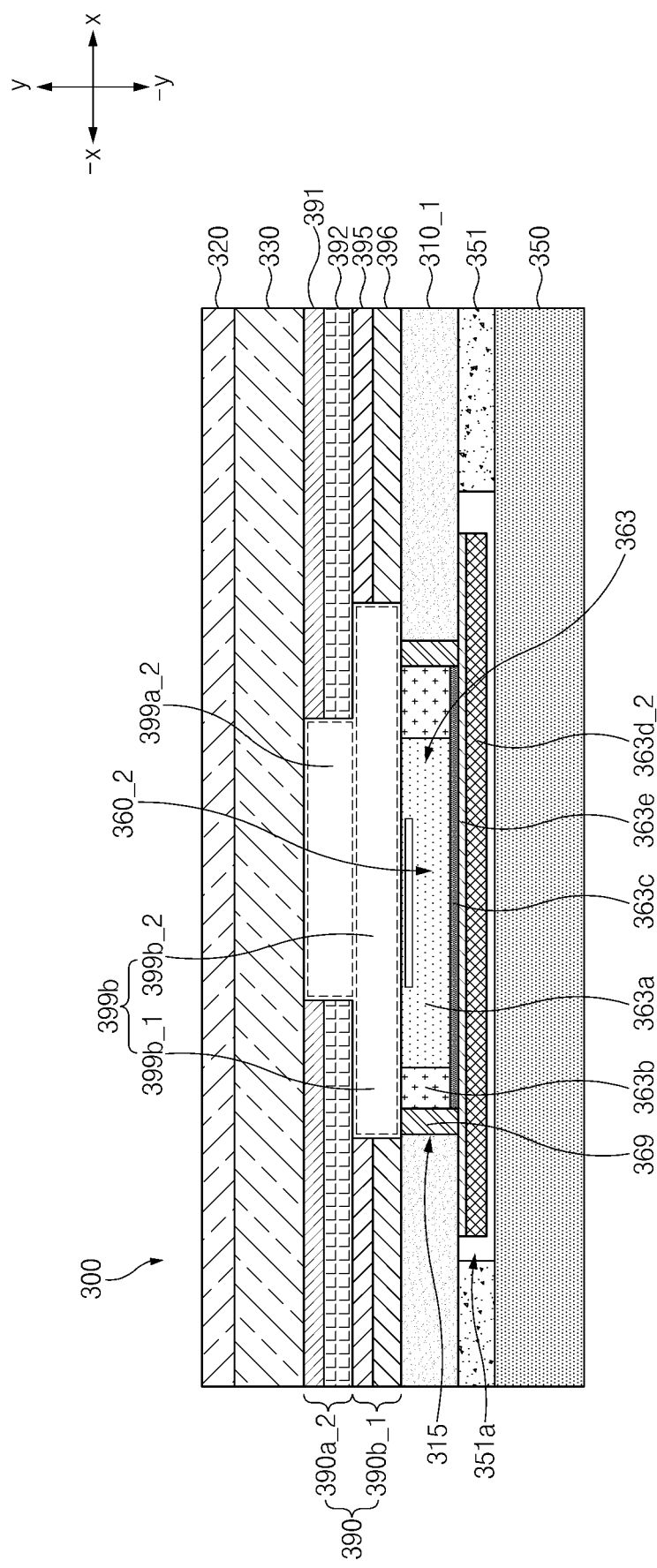
FIG. 6 is a view illustrating another example of a configuration of a back panel among components of an electronic device of FIG. 5.

FIG. 6 is a view illustrating another example of a configuration of a back panel among components of an electronic device of FIG. 5.

Referring to FIG. 6, the electronic device 300 according to an embodiment may include the front plate 320, the display 330, the back panel 390, the second sensor structure 360_2, the first support member 310_1, the battery 350, and the battery tape 351. The front plate 320, the display 330, the second sensor structure 360_2, the first support member 310_1, the battery 350, and the battery tape 351 may be substantially identical or similar to the components described with reference to FIG. 5 above. For example, the sensor hole 315 may be disposed at a portion of the first support member 310_1, and the battery hole 351a that penetrates the battery tape 351 vertically (from the y-axis to the negative y-axis) may be disposed at a portion of the battery tape 351. Also, the electronic device 300 may further include a back plate.

The back panel 390 may include a third group layer 390a_2 including the embossing layer 391 and the cushion layer 392, and the second group layer 390b_1 including the heat radiation layer 395 and the heat radiation adhesive layer 396. The third group layer 390a_2 described with reference to FIG. 6 may be identical to the first group layer 390a_1 described with reference to FIG. 5 above except for the electromagnetic induction panel 394 and the adhesive layer 393.

A third opening 399a_2 may be disposed on one side of the third group layer 390a_2. The second opening 399b may be disposed at the second group layer 390b_1. The third opening 399a_2 may be formed such that a depth in a vertical direction (from the y-axis to the negative y-axis) is different from that of the first opening 399a and a width is identical to that of the first opening 399a. For example, the third opening 399a_2 may be formed to be smaller in depth than the first opening 399a as much as a depth corresponding to the excluded electromagnetic induction panel and adhesive layer. The third opening 399a_2 and at least a portion of the second opening 399b may be connected. For example, the second opening 399b may include a first central opening region 399b_2 connected with the third opening 399a_2, and a first peripheral opening region 399b_1 connected with the first central opening region 399b_2 and extended outward. The first central opening region 399b_2 may be used as a light receiving path of the second sensor structure 360_2. The first central opening region 399b_2 and at least a portion of the first peripheral opening region 399b_1 may be used as a space where at least a portion of the second sensor structure 360_2 is seated.

The second sensor structure 360_2 may include the sensor 363, the second support substrate 363d_2, and the first adhesive member 363e. The first adhesive member 363e may be placed on the second support substrate 363d_2, and at least a portion of the first adhesive member 363e may contact a portion of the back surface of the first support member 310_1, which surrounds the sensor hole 315. The second adhesive member 369 may be formed at at least a portion of a space between the sensor hole 315 and the second sensor structure 360_2. The sensor 363 disposed at the second sensor structure 360_2 may collect a light signal transferred through at least a portion of the second opening 399b, at least a portion of the third opening 399a_2, and at least a portion of the display 330.

Figure 7:
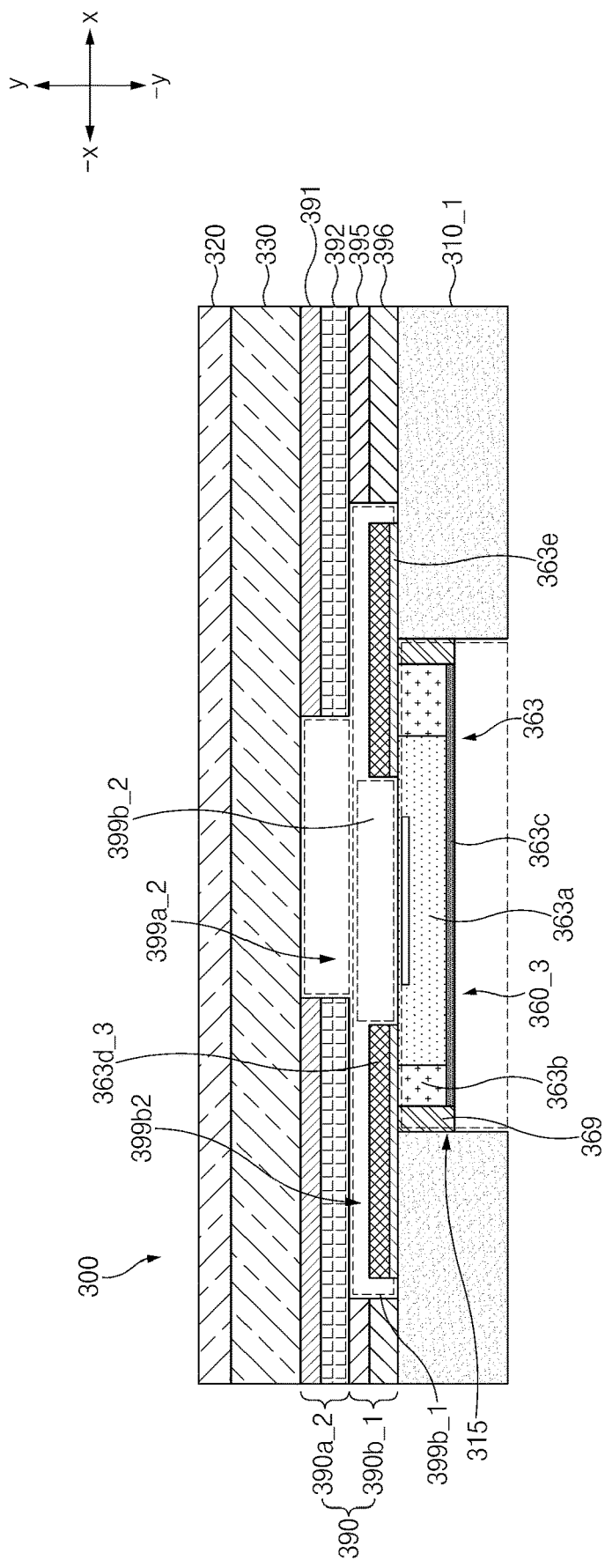
FIG. 7 is a view illustrating another example of a sensor structure among components of an electronic device of FIG. 6.

FIG. 7 is a view illustrating another example of a sensor structure among components of an electronic device of FIG. 6.

Referring to FIG. 7, the electronic device 300 according to an embodiment may include the front plate 320, the display 330, the back panel 390, a third sensor structure 360_3, and the first support member 310_1. Although not illustrated in FIG. 7, the electronic device 300 may further include a battery, a battery tape, and a back plate. The front plate 320, the display 330, the back panel 390, the first support member 310_1, the battery, and the battery tape may be substantially identical or similar to the components described with reference to FIG. 6 above. For example, the sensor hole 315 may be disposed at a portion of the first support member 310_1, and the battery hole 351a that penetrates the battery tape 351 vertically (from the y-axis to the negative y-axis) may be disposed at a portion of the battery tape 351.

The back panel 390 may include the third opening 399a_2 formed at the third group layer 390a_2 including the embossing layer 391 and the cushion layer 392, and a fourth opening 399b2 formed at the second group layer 390b_1 including the heat radiation layer 395 and the heat radiation adhesive layer 396. According to various embodiments, the third group layer 390a_2 and the third opening 399a_2 may be replaced with the first group layer 390a_1 and the first opening 399a described with reference to FIG. 5 above. The fourth opening 399b2 may have a relatively wide space compared to the third opening 399a_2. At least a portion of the third sensor structure 360_3 may be disposed in the fourth opening 399b2. For example, a third support substrate 363d_3 and at least a portion of the first adhesive member 363e of the third sensor structure 360_3 may be disposed in the fourth opening 399b2. For example, the third support substrate 363d_3 of the third sensor structure 360_3 may be disposed in the fourth opening 399b2, and the fourth opening 399b2 may include the first peripheral opening region 399b_1 where the third support substrate 363d_3 and the first adhesive member 363e are disposed, and the first central opening region 399b_2 where the third support substrate 363d_3 and the first adhesive member 363e are not disposed. The first central opening region 399b_2 may be connected with the third opening 399a_2 thereon such that the sensing unit 363a is exposed and receives a light associated with fingerprint sensing.

The third sensor structure 360_3 may include the sensor 363, the third support substrate 363d_3, and the first adhesive member 363e. Like the sensor 363 described with reference to FIG. 5 above, the sensor 363 may include the sensing unit 363a, the mold part 363b, and the substrate 363c.

The third support substrate 363d_3 may be disposed to cover (or vertically (from the y-axis to the negative y-axis) overlap) an outer portion of the sensor 363 (e.g., an outer portion of the sensing unit 363a and the mold part 363b), and a central portion of the sensor 363 may be formed to be exposed to the outside. For example, the third support substrate 363d_3 may be provided in the shape of a quadrilateral band where a central portion is empty. A region where an external light is received may be provided at a central portion of the sensing unit 363a, and an outer portion of the sensing unit 363a may be provided to support the central portion. The third support substrate 363d_3 may be disposed to cover (or vertically (from the y-axis to the negative y-axis) overlap) the mold part 363b and the remaining outer region of the sensing unit 363a other than the light receiving region. The first adhesive member 363e may be disposed on one surface (e.g., a surface facing the negative direction of the y-axis) of the third support substrate 363d_3. A portion of the first adhesive member 363e may be disposed on the outer portion of the sensing unit 363a and the mold part 363b.

As the third sensor structure 360_3 is disposed to vertically (from the y-axis to the negative y-axis) overlap a portion of an upper surface (e.g., a surface facing the y-axis) of the first support member 310_1, which surrounds the sensor hole 315, the remaining portion (other than the portion which is disposed on the outer portion of the sensing unit 363a and the mold part 363b) of the first adhesive member 363e may contact a portion of the upper surface of the first support member 310_1. As such, the sensor 363 of the third sensor structure 360_3 may be disposed in the sensor hole 315 and may be first fixed by the first adhesive member 363e. Afterwards, as the second adhesive member 369 is disposed at at least a portion of a space between the sensor hole 315 and the third sensor structure 360_3, the sensor 363 of the third sensor structure 360_3 may be stably fixed in the sensor hole 315.

As some components of the third sensor structure 360_3, for example, the third support substrate 363d_3 and the first adhesive member 363e are disposed on the upper surface (e.g., a surface facing the y-axis) of the first support member 310_1, the third support substrate 363d_3 and the first adhesive member 363e may be disposed in the fourth opening 399b2. Even though a portion of the third sensor structure 360_3 is disposed in the fourth opening 399b2, because the sensor 363 is placed in the sensor hole 315, a focal length of the sensor 363 may be substantially identical to the focal length of the sensor 363 described with reference to FIG. 6.

Figure 8:
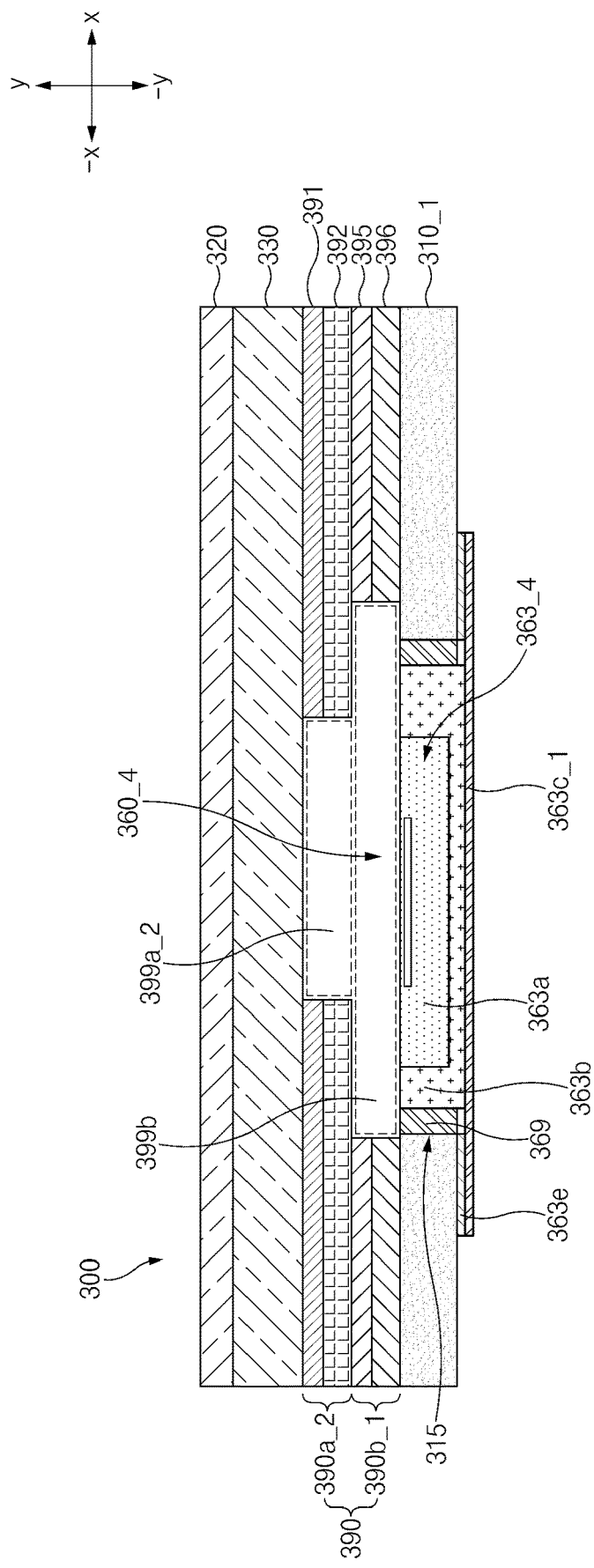
FIG. 8 is a view illustrating another shape of a sensor structure among components of an electronic device of FIG. 6.

FIG. 8 is a view illustrating another shape of a sensor structure among components of an electronic device of FIG. 6.

Referring to FIG. 8, the electronic device 300 according to an embodiment may include the front plate 320, the first display 330, the back panel 390, a fourth sensor structure 360_4, and the first support member 310_1. Although not illustrated in FIG. 8, the electronic device 300 may further include a battery, a battery tape, and a back plate. The front plate 320, the display 330, the back panel 390, the first support member 310_1, the battery, and the battery tape may be substantially identical or similar to the components described with reference to FIG. 6 above. For example, the sensor hole 315 may be disposed at a portion of the first support member 310_1.

The back panel 390 may include the third opening 399a_2 formed at the third group layer 390a_2 including the embossing layer 391 and the cushion layer 392, and the second opening 399b formed at the second group layer 390b_1 including the heat radiation layer 395 and the heat radiation adhesive layer 396. According to various embodiments, the third group layer 390a_2 and the third opening 399a_2 may be replaced with the first group layer 390a_1 and the first opening 399a described above. The second opening 399b may have a relatively wide space compared to the third opening 399a_2. According to various embodiments, at least a portion of the fourth sensor structure 360_4 may be disposed in the second opening 399b. An example is illustrated as a portion of the fourth sensor structure 360_4 is disposed in the sensor hole 315 of the first support member 310_1. However, the fourth sensor structure 360_4 may be disposed to protrude from an upper surface (e.g., a surface facing the y-axis) of the first support member 310_1; in this case, at least a portion of the fourth sensor structure 360_4 may be disposed in the second opening 399b.

The fourth sensor structure 360_4 may include a sensor 363_4, an extended substrate 363c_1, and the first adhesive member 363e, and the sensor 363_4 may include the sensing unit 363a and the mold part 363b. The sensing unit 363a may include a light receiving region, in which a light transferred from the outside is collected, at a central portion, and an outer portion of the sensing unit 363a may be disposed to support the light receiving region of the central portion. The mold part 363b may be disposed to surround the outer portion of the sensing unit 363a. The extended substrate 363c_1 may have a relatively wide size compared to the substrate 363c of sensor (such as the biometric sensor) described with reference to FIGS. 5 to 7 above. For example, the extended substrate 363c_1 may be formed such that the sensing unit 363a and the mold part 363b surrounding the sensing unit 363a are placed at a central portion of the extended substrate 363c_1, a size of the extended substrate 363c_1 is formed to be larger than the mold part 363b, and the first adhesive member 363e is placed at a portion of an upper surface (e.g., a surface facing the y-axis) of the extended substrate 363c_1. The first adhesive member 363e may be disposed on the extended substrate 363c_1 in the shape of a band. At least a portion of the battery 350 placed below the first support member 310_1 may be attached with of at least a portion of the extended substrate 363c_1 by an adhesive film.

The first adhesive member 363e may be disposed at an outer portion of an upper surface (e.g., a surface facing the y-axis direction) of the extended substrate 363c_1. As the sensing unit 363a and the mold part 363b are provided in the shape of a quadrangle, the first adhesive member 363e may be provided in the shape of a quadrangular band. The first adhesive member 363e may be disposed at a portion of the back surface of the first support member 310_1, which surrounds the sensor hole 315, and may allow the extended substrate 363c_1 to be adhered to the back surface of the first support member 310_1. The first adhesive member 363e may include at least one of a liquid type adhesive means and a solid type adhesive means.

The second adhesive member 369 may be disposed in at least a portion of a space between the mold (or molded) part 363b and side walls of the sensor hole 315. In this regard, in a state where the sensing unit 363a and the mold part 363b are disposed in the sensor hole 315 by the first adhesive member 363e, the second adhesive member 369 of a liquid type may be applied between the side wall(s) of the sensor hole 315 and the mold part 363b and may then cure. In other words, the adhesive may fill the portion of the sensor hole 315 not occupied by the sensing unit 363a and the mold part 363b. As such, a portion of the fourth sensor structure 360_4 may be fixed in the sensor hole 315. The fourth sensor structure 360_4 described above may make it possible to secure a space capable of placing the first adhesive member 363e by extending a substrate where the sensing unit 363a of the sensor 363 is placed. In this case, because a support substrate is not used, a component of a sensor structure may be omitted, and thus, a total thickness of the sensor structure may decrease.

According to various embodiments, a portable communication device corresponding to the electronic device (300) may include a display panel (330), a sheet layer (390) disposed below the display panel, the sheet layer including a first opening (399a_2, 399b), a bracket (310_2 (see FIG. 10)) disposed below the sheet layer, the bracket including a second opening (315, 318a (see FIG. 10)) that at least partially overlaps with the first opening, wherein the second opening includes a first portion (315) having a first width, and a second portion (318a) provided below the first portion and having a second width greater than the first width, a sensor (363_4) disposed in the first portion of the second opening and configured to receive a portion of a light, which is reflected by an external object and then passes through the display panel and the first opening of the sheet layer (390) and a support plate (363c_1) coupled to the sensor (363_4) and disposed in the second portion of the second opening.

According to various embodiments, wherein the sensor is attached with the support plate by an adhesive member.

According to various embodiments, the portable communication device may further include a gap formed between the first portion and the sensor and the gap is filled with an adhesive means.

According to various embodiments, the portable communication device may further include a battery placed below the bracket and at least portion of the battery is attached with at least portion of the support plate by an adhesive film.

According to various embodiments, the portable communication device may further include an adhesive film (the adhesive film may include at least one of a liquid type adhesive means and a solid type adhesive means) disposed between the bracket and the support plate and the adhesive film provides function that at least portion of the support plate is attached with the bracket.

Figure 9:
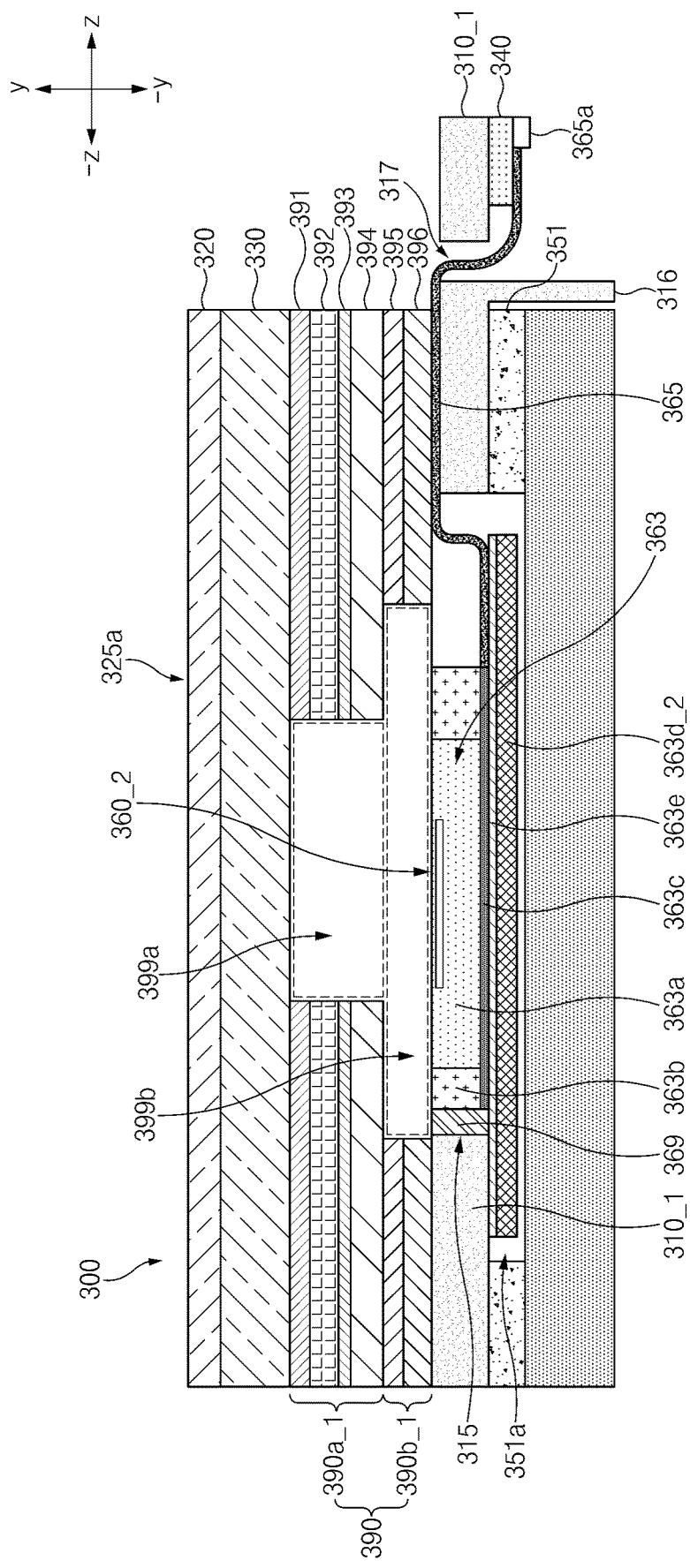
FIG. 9 is a cross-sectional view illustrating a portion of a configuration of an electronic device taken along line B-B' of FIG. 1.

FIG. 9 is a cross-sectional view illustrating a portion of a configuration of an electronic device taken along line B-B' of FIG. 1.

Referring to FIG. 9, the electronic device 300 according to an embodiment may include the front plate 320, the display 330, the back panel 390, the second sensor structure 360_2, and the first support member 310_1. According to various embodiments, the electronic device 300 may further include the battery 350 disposed below the first support member 310_1 (e.g., in the negative direction of the y-axis), and the battery tape 351 disposed between the first support member 310_1 and the battery 350. This configuration may be substantially identical to the configuration of the electronic device 300 described with reference to FIG. 5 above. For example, the sensor hole 315 in which at least a portion of the second sensor structure 360_2 is seated may be formed at the first support member 310_1, and the battery hole 351a in which at least a portion of the second sensor structure 360_2 is disposed may be formed at the battery tape 351. The back panel 390 may include the first opening 399a and the second opening 399b associated with a light receiving operation of the second sensor structure 360_2, and the first opening 399a and the second opening 399b may be at least partially connected. The second sensor structure 360_2 may obtain a light signal associated with a user fingerprint on the front plate 320 by using a height of all of the front plate 320, the display 330, the first opening 399a, and the second opening 399b as a focal length. In addition, the electronic device 300 may further include the wire part 365 connected with the sensor 363 of the second sensor structure 360_2, and a wire hole 317 of the first support member 310_1, which provides a path through which the wire part 365 is capable of being connected with the printed circuit board 340. According to various embodiments, the wire hole 317 may be formed adjacent to a side wall 316 surrounding the battery 350. Alternatively, at least a portion of the wire hole 317 may be disposed between the side wall 316 and the first support member 310_1.

One side of the wire part 365 may be electrically connected with the substrate 363c of the second sensor structure 360_2, and an opposite side thereof may be connected with one side of the printed circuit board 340. In this regard, at least a portion of the wire part 365 may be formed of an FPCB having ductility. A placement structure of the wire part 365 of the FPCB shape is not limited to FIG. 9 (in other words, the arrangement of the FPCB type wire part 365 is not limited to the arrangement shown in FIG. 9) and may be applied to the embodiments described with reference to FIGS. 2 to 14 in an identical or similar manner. As the wire part 365 is disposed to be connected with the substrate 363c, the wire part 365 may contact at least a portion of the first adhesive member 363e disposed below the substrate 363c. For example, the wire part 365 may be positioned on one surface (e.g., a surface facing in the y-axis direction) of the first support member 310_1 while extended in one direction (e.g., a z-axis direction) and may then be extended toward a back surface (e.g., a surface facing the negative direction of the y-axis) of the first support member 310_1 through the wire hole 317 formed at the first support member 310_1 such that one end of the wire part 365 is electrically connected with the printed circuit board 340. For the electrical connection with the printed circuit board 340, a connector 365a may be connected with one end of the wire part 365.

Figure 10:
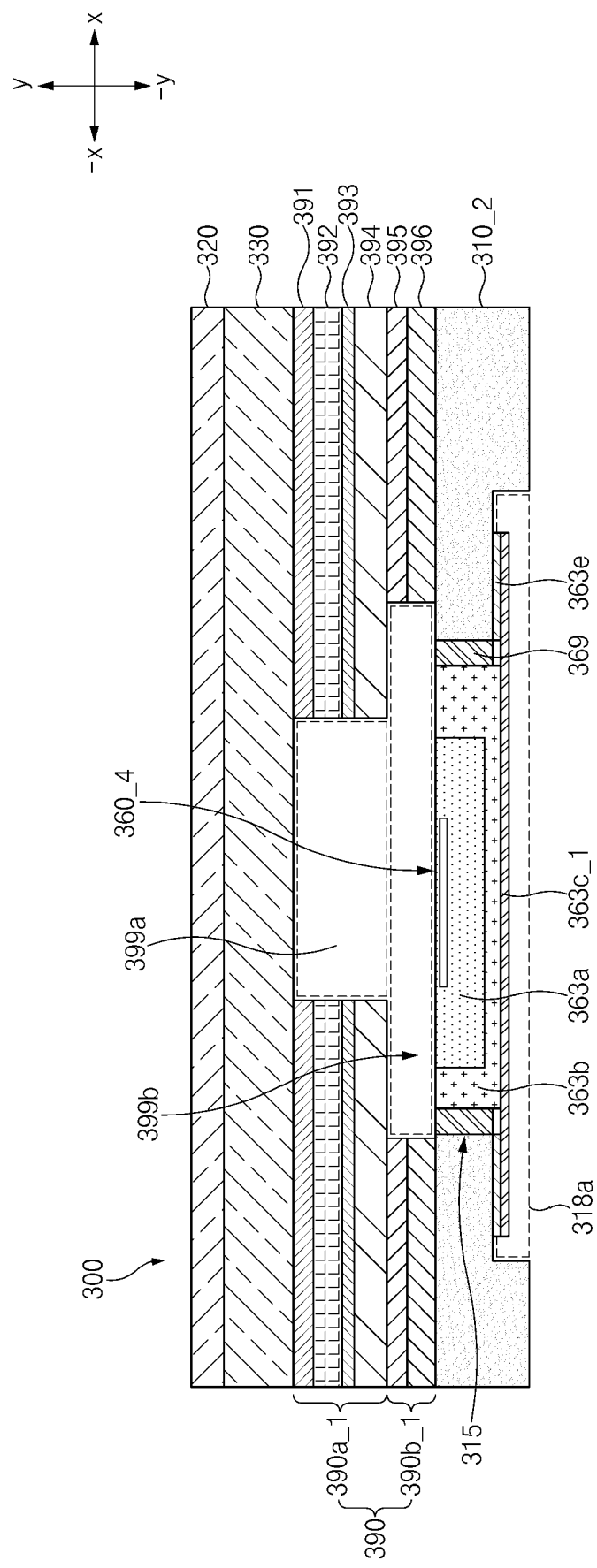
FIG. 10 is a cross-sectional view illustrating another example of a portion of a configuration of an electronic device taken along line A-A' of FIG. 1.

FIG. 10 is a cross-sectional view illustrating another example of a portion of a configuration of an electronic device taken along line A-A' of FIG. 1.

Referring to FIG. 10, at least a portion of the electronic device 300 may include the front plate 320, the display 330, the back panel 390, a second support member 310_2, and the fourth sensor structure 360_4. In addition, the electronic device 300 may further include a battery placed below the second support member 310_2, and a battery tape disposed between the second support member 310_2 and the battery, and may further include a back plate disposed below the battery. Configurations of the front plate 320, the display 330, and the back panel 390 may be substantially identical to the configurations of the front plate 320, the display 330, and the back panel 390 described with reference to FIG. 5. For example, the back panel 390 may include the first group layer 390a_1 and the second group layer 390b_1, the first group layer 390a_1 may include the first opening 399a, and the second group layer 390b_1 may include the second opening 399b.

At least a portion of the second support member 310_2 may be disposed below the back panel 390. A first step space 318a (or a second portion, a part of a second opening, a recess) may be formed in a region, which corresponds to the sensor hole 315 where a portion of the fourth sensor structure 360_4 is disposed, from among various regions of the second support member 310_2. The first step space 318a may form an empty space larger than the sensor hole 315. Alternatively, the first step space 318a may be formed to be larger in diameter than the sensor hole 315. The sensor hole 315 may be disposed above the first step space 318a (e.g., on one side in the y-axis). The first step space 318a and the sensor hole 315 may be at least partially connected. With regard to a shape of the second support member 310_2, one cross section of a region where the sensor hole 315 and the first step space 318a are formed may have an "L" shape or an "inverted L" shape. The second support member 310_2 may be rectangular, the sensor hole 315 may be rectangular, and the first step space 318*a* may be rectangular. The sensor hole 315 and first step space 318*a* may together be described as forming a second opening, that second opening extending through the support member (e.g., the second support member 310_2), from an upper surface to a lower surface. The sensor hole may be described as a first portion of that second opening, and the first step space may be described as a second portion of that second opening. It will be appreciated that the second portion (318*a*) forms a recess in a lower (i.e. downward-facing) surface of the support member, that recess being arranged to fully accommodate the extended substrate 363*c*_1 of the sensor structure. Thus, the sensor structure is accommodated without extending below the lower surface of the support member, therefor enabling a device of reduced thickness to be achieved. In the illustrated example, the lower surface of the substrate (363*c*_1) is above the lower edge of the recess (318*a*), but in alternative examples the lower surface of the substrate may be closer to that lower edge, or even level with it, such that the lower surface of the substrate may, in certain examples, be flush with the lower surface of the support member immediately surrounding the recess.

The fourth sensor structure 360_4 may have the same configuration as the sensor structure described with reference to FIG. 8 above. For example, the fourth sensor structure 360_4 may include the sensing unit 363*a*, the mold (molded) part 363*b*, the extended substrate 363*c*_1 (or a support plate, a substrate), and the first adhesive member 363*e*, and the extended substrate 363*c*_1 may be wider (i.e. greater) in area than the mold part 363*b*. The sensing unit 363*a* and the mold part 363*b* may be disposed at a central portion of the extended substrate 363*c*_1, and the first adhesive member 363*e* may be disposed at an outer portion thereof. As such, the first adhesive member 363*e* may be disposed at an outer portion of an upper surface (e.g., a surface facing the y-axis direction) of the extended substrate 363*c*_1 and may be formed in the shape of a band. The first adhesive member 363*e* disposed on the extended substrate 363*c*_1 may contact an upper surface (e.g., a surface facing the negative direction of the y-axis) of the first step space 318*a* such that the extended substrate 363*c*_1 is adhered to the second support member 310_2. The extended substrate 363*c*_1 and the first adhesive member 363*e* may be disposed in the first step space 318*a*; in the case where the sensing unit 363*a* and the mold part 363*b* are disposed on the extended substrate 363*c*_1, the sensing unit 363*a* and at least a portion of the mold part 363*b* may be disposed in the sensor hole 315. The second adhesive member 369 may be disposed between the mold part 363*b* and an inner wall of the sensor hole 315.

In the case where a contact on the front plate 320 is made by a finger, the electronic device 300 of the above structure may collect a light incident onto an upper surface of the fourth sensor structure 360_4 (e.g., an upper surface (e.g., a surface facing in the y-axis direction) of the sensing unit 363*a*) through the display 330, the first opening 399*a*, and the second opening 399*b* as a light emitted from a pixel of the display 330 toward the front plate 320 is reflected by a finger surface. The fourth sensor structure 360_4 may obtain fingerprint information by processing a light that is reflected by a finger and then arrives through respective layers.

Figure 11:
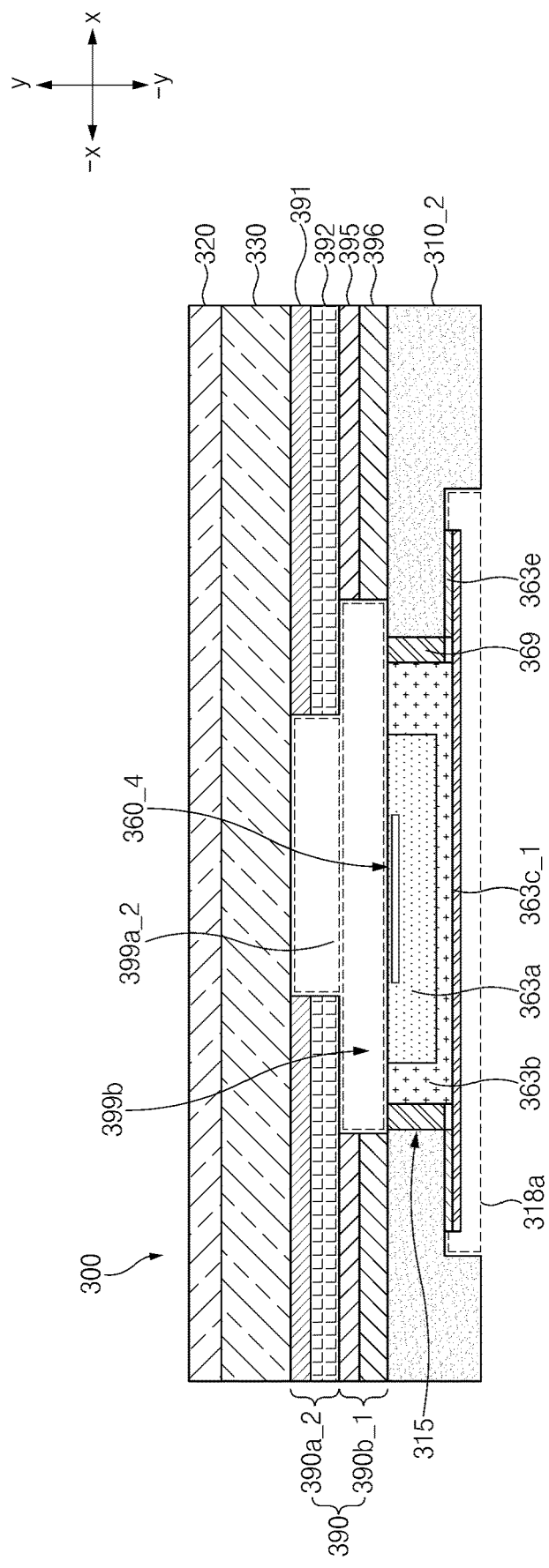
FIG. 11 is a view illustrating another shape of a configuration of a back panel among components of an electronic device of FIG. 10.

FIG. 11 is a view illustrating another shape of a configuration of a back panel among components of an electronic device of FIG. 10.

Referring to FIG. 11, the electronic device 300 according to an embodiment may include the front plate 320, the display 330, the back panel 390, the second support member 310_2, and the fourth sensor structure 360_4. Configurations of the front plate 320, the display 330, the second support member 310_2, and the fourth sensor structure 360_4 may be substantially identical or similar to the configurations of the front plate, the display, the second support member, and the fourth sensor structure described with reference to FIG. 10 above.

For example, the back panel 390 may include the third group layer 390*a*_2 including the embossing (embossed) layer 391 and the cushion layer 392, and the second group layer 390*b*_1 including the heat radiation layer 395 and the heat radiation adhesive layer 396. The third opening 399*a*_2 may be formed at the third group layer 390*a*_2, the second opening 399*b* may be formed at the second group layer 390*b*_1, central portions of the third opening 399*a*_2 and the second opening 399*b* may be interconnected, and the second opening 399*b* may form a relatively wide empty space compared to the third opening 399*a*_2. An example is illustrated as a portion of the fourth sensor structure 360_4 is disposed in the sensor hole 315 of the second support member 310_2. However, the fourth sensor structure 360_4 may be disposed to protrude from an upper surface (e.g., a surface facing the y-axis) of the second support member 310_2; in this case, at least a portion of the fourth sensor structure 360_4 may be disposed in the second opening 399*b*. In addition, at least a portion of the second adhesive member 369 used to fix a portion of the fourth sensor structure 360_4 in the sensor hole 315 may be disposed in an empty space formed by the second opening 399*b*. According to various embodiments, an adhesive member may be further disposed between an edge of the first step space 318*a* and the fourth sensor structure 360_4.

In the electronic device 300 described above, the central portion of the third opening 399*a*_2 and the central portion of the second opening 399*b* may at least partially overlap each other (e.g. such that the central portions connect with, and are in communication with each other), and a central portion of the fourth sensor structure 360_4 may be disposed below the overlapping central portions described above so as to at least partially overlap each other. As such, an external light passing through a front plate and a display may arrive at the fourth sensor structure 360_4. Like the embodiment described with reference to FIG. 10, the substrate 363*c*_1 supporting the sensor (or sensor array) 363_4 (see FIG. 8) is completely accommodated within the second portion 318*a* of the second opening (including 315 and 318*a*), so that it does not protrude below a lower perimeter edge of the recess 318*a*. The substrate 363*c*_1 is secured to the second support member 310_2 by adhesive means such as the first adhesive member 363*e* (e.g. an adhesive tape, layer, body, sheet, or film) attaching a peripheral portion of an upper surface of the substrate 363*c*_1 to a downward facing portion of a flat surface of the second support member 310_2 that surrounds the sensor hole 315.

Figure 12:
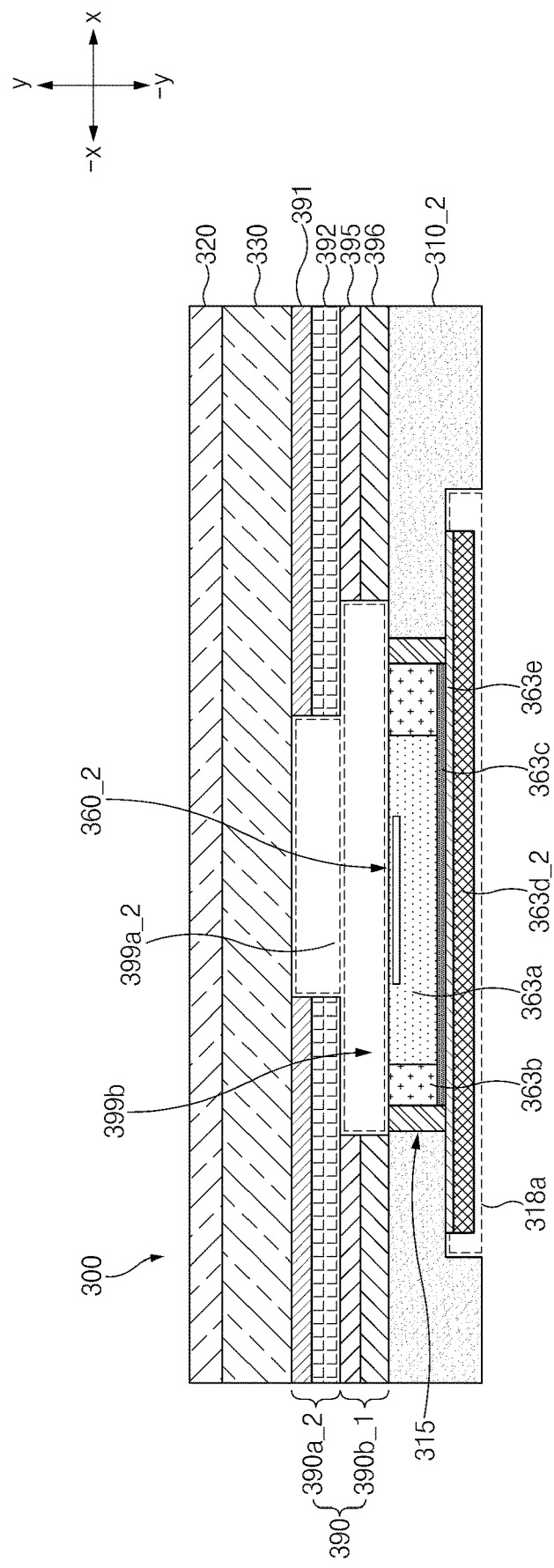
FIG. 12 is a view illustrating another example of a configuration of a sensor structure among components of an electronic device of FIG. 11.

FIG. 12 is a view illustrating another example of a configuration of a sensor structure among components of an electronic device of FIG. 11.

Referring to FIG. 12, the electronic device 300 according to an embodiment may include the front plate 320, the display 330, the back panel 390, the second support member 310_2, and the second sensor structure 360_2. In addition, the electronic device 300 may further include a battery and a back plate. Configurations of the front plate 320, the display 330, the back panel 390, and the second support member 310_2 may be substantially identical or similar to the configurations of the front plate, the display, the back panel, and the second support member described with reference to FIG. 11 above. For example, the back panel 390 may include the third group layer 390a_2 including the embossing layer 391 and the cushion layer 392, and the second group layer 390b_1 including the heat radiation layer 395 and the heat radiation adhesive layer 396, the third opening 399a_2 may be formed at the third group layer 390a_2, and the second opening 399b may be formed at the second group layer 390b_1. According to various embodiments, the third group layer 390a_2 and the third opening 399a_2 may be replaced with the first group layer 390a_1 and the first opening 399a described above. In the second support member 310_2, the sensor hole 315 and the first step space 318a may be seamlessly (or continuously) disposed, and the first step space 318a may be disposed below the sensor hole 315 (e.g., in the negative direction of the y-axis). A diameter of the first step space 318a may be larger than a diameter of the sensor hole 315. The sensor 363 may be disposed in the sensor hole 315, and the second support substrate 363d_2 and the first adhesive member 363e may be disposed in the first step space 318a. A portion of the sensor 363 may be disposed in the first step space 318a depending on a shape of the second sensor structure 360_2.

The second sensor structure 360_2 may include the sensor 363, the second support substrate 363d_2, and the first adhesive member 363e. The sensor 363 may include the sensing unit 363a, the mold part 363b, and the substrate 363c. The sensing unit 363a and the mold part 363b may be disposed on the substrate 363c, and a total size of the sensing unit 363a and the mold part 363b may correspond to a size of the substrate 363c. The first adhesive member 363e may be disposed on the second support substrate 363d_2, and the substrate 363c may be disposed on the first adhesive member 363e. For example, the substrate 363c may be disposed at a central portion of the second support substrate 363d_2. The second support substrate 363d_2 may be formed to be larger in size than the substrate 363c. As such, in an outer portion of the second support substrate 363d_2, the first adhesive member 363e may not be covered by the substrate 363c and may be exposed, and thus, the first adhesive member 363e may be adhered to an upper surface (e.g., a surface facing the negative direction of the y-axis) of the first step space 318a. The first step space 318a may be formed to have a height that is equal to or greater than a thickness of both the second support substrate 363d_2 and the first adhesive member 363e. The sensor hole 315 may be formed to have a height similar to the height of the sensor 363. The second adhesive member 369 may be disposed between an inner wall of the sensor hole 315 and an outer wall of the sensor 363 (e.g., an outer wall of the mold part 363b). As a wire part is disposed at the sensor 363, the second adhesive member 369 may be provided in the shape of a band surrounding at least three side surfaces of the sensor 363.

Similarly to the embodiment described with reference to FIG. 11, the second support substrate 363d_2 of the sensor structure is fully accommodated within the recess 318a. Adhesive means (e.g. adhesive tape, or any other adhesive means mentioned elsewhere in this specification) may be used to attach a battery to an underside of the second support substrate 363d_2. The lower peripheral surface of the support member surrounding the recess 318a may, in certain examples, be arranged so as to be level (i.e. substantially coplanar) with the lower surface of the second support substrate 363d_2, and adhesive means may be arranged to adhere respective portions of a battery upper surface to at least part of that lower peripheral surface and to at least part of the lower surface of the second support substrate 363d_2.

Figure 13:
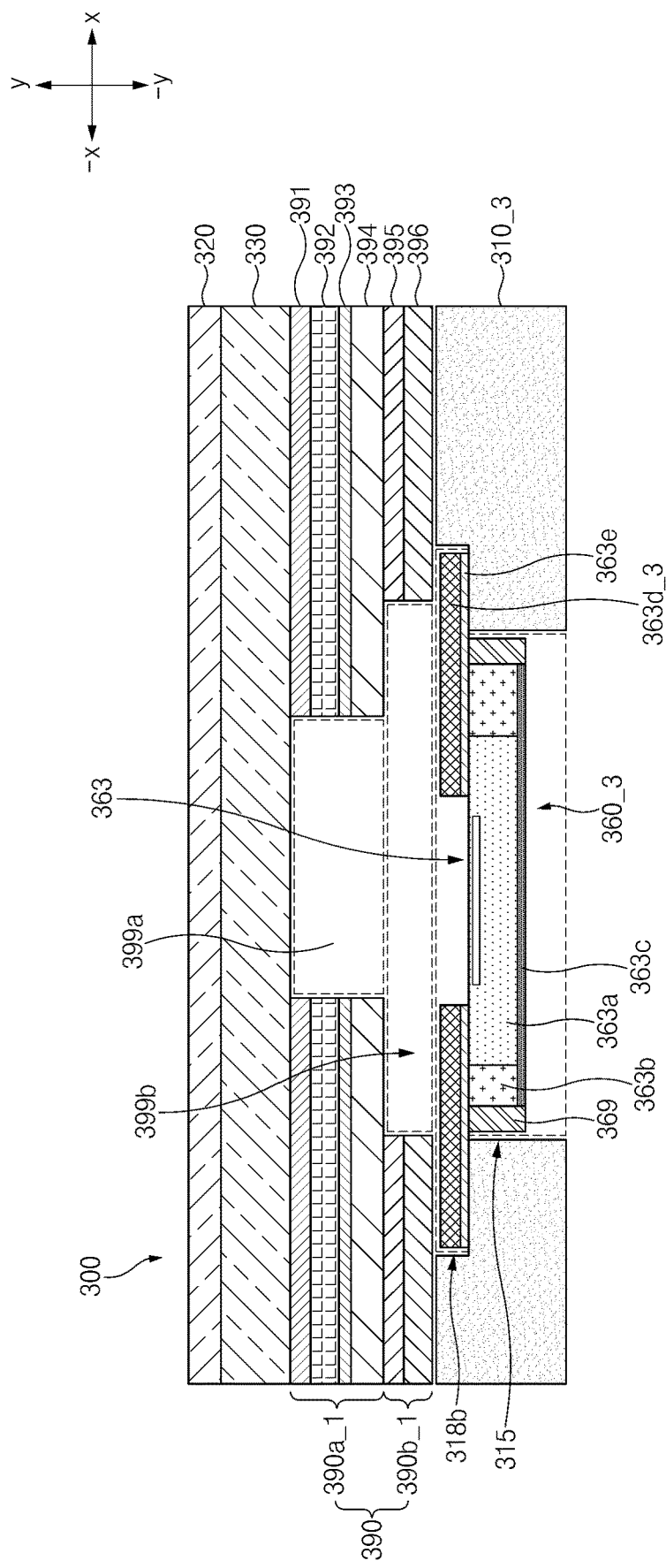
FIG. 13 is a view illustrating an example of another shape of a support member and a sensor structure among components of an electronic device of FIG. 10.

FIG. 13 is a view illustrating an example of another shape (or form) of a support member and a sensor structure among components of an electronic device of FIG. 10.

Referring to FIG. 13, the electronic device 300 according to an embodiment may include the front plate 320, the display 330, the back panel 390, a third support member 310_3, and the third sensor structure 360_3. The electronic device 300 may further include a battery placed below the third sensor structure 360_3 and the third support member 310_3 and a back plate disposed below the battery. Configurations of the front plate 320, the display 330, and the back panel 390 may be substantially identical or similar to the configurations of the front plate 320, the display 330, and the back panel 390 described with reference to FIG. 10.

The third support member 310_3 may include the sensor hole 315 in which the sensor 363 of the third sensor structure 360_3 is disposed, and a second step space 318b disposed on an upper side of the sensor hole 315 (e.g., in the y-axis direction). The sensor hole 315 and at least a portion of the second step space 318b may be connected. A diameter of the second step space 318b may be larger than a diameter of the sensor hole 315. An upper side of the second step space 318b may be opened, and thus, at least a portion of the second step space 318b may be connected with an empty space formed by the second opening 399b. According to various embodiments, the second step space 318b may be formed to be larger than a diameter of the second opening 399b. The second step space 318b may be provided in a shape corresponding to a shape of the third sensor structure 360_3, for example, in the shape of a quadrangular hole. As the second step space 318b and the sensor hole 315 are continuous (or seamless), an empty space provided by the second step space 318b and the sensor hole 315 may have an inverted hat shape.

The third sensor structure 360_3 may include the sensor 363 including the sensing unit 363a, the mold part 363b, and the substrate 363c, the third support substrate 363d_3 disposed above the sensor 363 (e.g., in the y-axis direction), and the first adhesive member 363e disposed between the third support substrate 363d_3 and the sensor 363. The third support substrate 363d_3 may cover (or vertically (from the y-axis to the negative y-axis) overlap) the mold part 363b and an outer portion of the sensing unit 363a, may be extended outward from the center of the sensing unit 363a, and may be formed to be larger than the substrate 363c. The third support substrate 363d_3 may be provided in the shape of a band of an empty quadrangle such that a light is transferred to the central portion of the sensing unit 363a. At least a portion of the first adhesive member 363e disposed below the third support substrate 363d_3 (e.g., in the negative direction of the y-axis) may be adhered to the mold part 363b and the outer portion of the sensing unit 363a, and the other portion thereof may be adhered to a surface (e.g., a surface facing the y-axis direction) of the second step space 318b. As such, the third sensor structure 360_3 may be first fixed to one side of the third support member 310_3 by using the third support substrate 363d_3 and the first adhesive member 363e, and may then be fixed based on (or by means of) the second adhesive member 369 disposed between the sensor hole 315 and the mold part 363b.

In the electronic device 300 of the above structure, a light transferred through the front plate 320 and the display 330 may be transferred to the sensor 363 through the first opening 399a and the second opening 399b. As the third support substrate 363d_3 and the first adhesive member 363e are disposed in the second step space 318b, an upper surface (e.g., a surface facing the y-axis direction) of the sensor 363 of the third sensor structure 360_3 may be disposed to be lower than an upper surface (e.g., a surface facing the y-axis direction) of the third support member 310_3 on the y-axis. As such, a focal length that the electronic device 300 described with reference to FIG. 13 secures (or provides) may be longer than a focal length that an electronic device of any other structure secures. As a longer focal length is secured, a focal length of the sensor 363 may be adjusted in the process of manufacturing the sensor 363.

Figure 14:
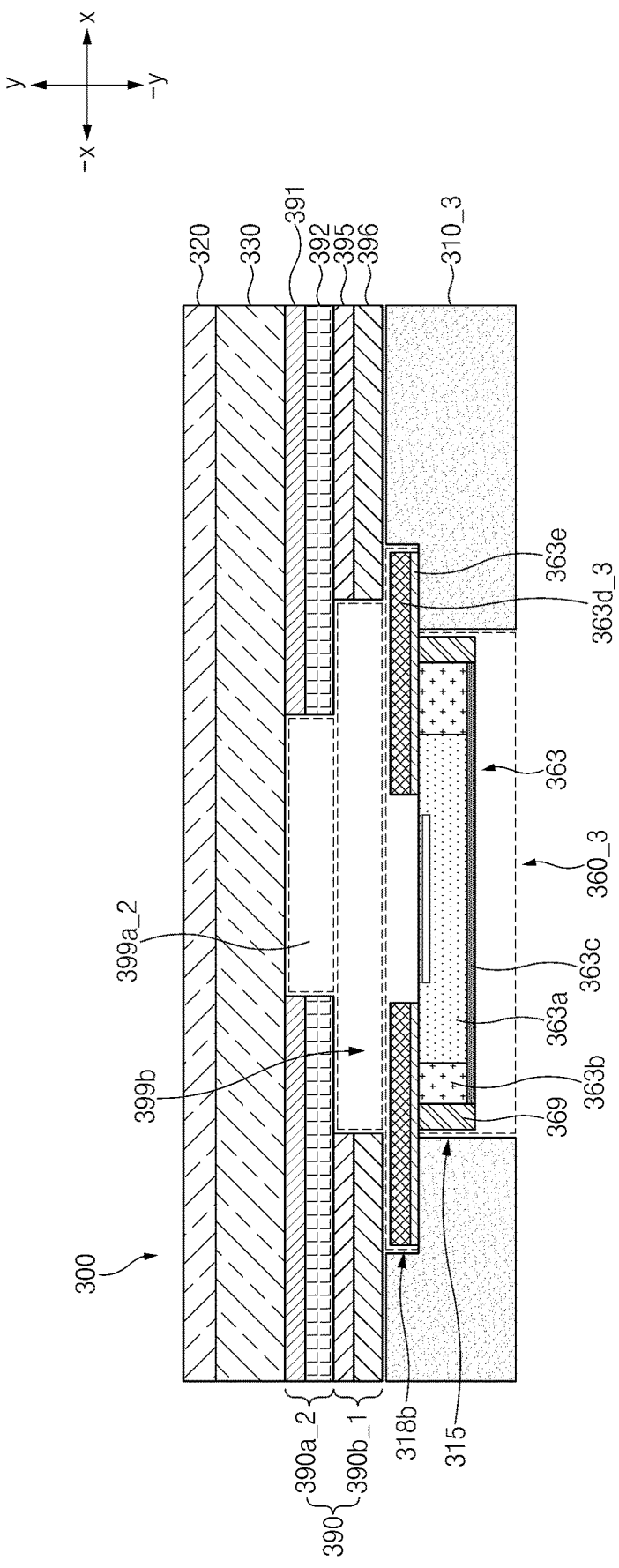
FIG. 14 is a view illustrating another example of a configuration of a back panel among components of an electronic device of FIG. 13.

FIG. 14 is a view illustrating another example of a configuration of a back panel among components of an electronic device of FIG. 13.

Referring to FIG. 14, the electronic device 300 according to an embodiment may include the front plate 320, the display 330, the back panel 390, the third support member 310_3, and the third sensor structure 360_3. The electronic device 300 may further include a battery placed below the third sensor structure 360_3 and the third support member 310_3 and a back plate disposed below the battery. Configurations of the front plate 320, the display 330, the third support member 310_3, and the third sensor structure 360_3 may be substantially identical or similar to the configurations of the front plate 320, the display 330, the third support member 310_3, and the third sensor structure 360_3 described with reference to FIG. 13.

The back panel 390 may include the third group layer 390a_2 including the embossing layer 391 and the cushion layer 392, and the second group layer 390b_1 including the heat radiation layer 395 and the heat radiation adhesive layer 396. The third opening 399a_2 may be formed at the third group layer 390a_2, and the second opening 399b may be formed at the second group layer 390b_1. At least a portion of an empty space formed in the third opening 399a_2 may be connected with at least a portion of an empty space formed in the second opening 399b. As the third support substrate 363d_3 of the third sensor structure 360_3 is placed above the sensor 363 (e.g., in the y-axis direction), at least a portion of the second group layer 390b_1 may face at least a portion of the third support substrate 363d_3. For example, at least a portion of the heat radiation adhesive layer 396 may be disposed to face an outer portion of the third support substrate 363d_3. The second adhesive member 369 may be disposed between an inner wall of the sensor hole 315 formed at the third support member 310_3 and an outer wall of the sensor 363. According to various embodiments, an adhesive member may be disposed in at least a partial space including an edge of the second step space 318b, or an outer portion of the third support substrate 363d_3 and a side wall of the second step space 318b.

Meanwhile, the description is given above as the third group layer 390a_2 includes the embossing layer 391 and the cushion layer 392. However, at least one of the above components may be omitted, or any other component (e.g., an additional adhesive layer) may be further included. Also, each of the second group layer 390b_1 and the third group layer 390a_2 may not include at least one of the corresponding layers or may further include any other layers.

A light receiving structure of a sensor structure described with reference to FIGS. 1 to 14 above may provide a focal length including the front plate 320, the display 330, the first opening (or the third opening), and the second opening (or the fourth opening). A focal length may be changed depending on a difference between structures described in respective drawings, and a focal length of a sensor such as a biometric sensor may be differently set depending on a structure of each electronic device in the process of manufacturing the sensor.

According to various embodiments, an electronic device (300) may include a display (330), a back panel (390) that is disposed below the display, a support member (310) that is disposed below the back panel, a sensor (363) that is disposed such that at least a portion of the sensor faces a back surface of the display through a sensor hole formed at the support member, a first adhesive member (363e) that adheres at least a portion of the sensor on one side of the support member, and a second adhesive member (369) that is disposed between the sensor (or a sensor structure (360) including the sensor) and the sensor hole (315).

According to various embodiments, the electronic device may further include a support substrate (361) that supports the sensor, and the first adhesive member may be disposed at at least a portion of one surface of the support substrate.

According to various embodiments, the electronic device may further include a support substrate (361) that supports the sensor, and the first adhesive member forms at least a portion of the support substrate.

According to various embodiments, at least a portion of the support substrate may be formed of at least one of a film, a magnetic field blocking member, or a metal sheet (e.g., SUS (stainless use steel) stiffener).

According to various embodiments, the electronic device may further include a first support substrate (363d_1) that is disposed below the sensor, and the first support substrate may be adhered to a portion of a back surface of the support member, which surrounds the sensor hole (315), through the first adhesive member.

According to various embodiments, the electronic device may further include a third support substrate (363d_3) that is disposed above the sensor, and the third support substrate may be adhered to a portion of an upper surface of the support member, which surrounds the sensor hole, through the first adhesive member.

According to various embodiments, the sensor may include a sensing unit (363a) collecting a light, a mold part (363b) formed around the sensing unit (363a), and a substrate (363c) formed to be larger than the sensing unit and the mold part, and the first adhesive member may be disposed at at least a portion of one surface of the substrate.

According to various embodiments, the back panel may include an opening (399a, 399b), and the opening may be formed in a region of the back panel, which corresponds to the sensor hole.

According to various embodiments, the back panel may include a plurality of layers, a part of the plurality of layers may include a first opening (399a) of a first size, and the remaining layers of the plurality of layers may include a second opening (399b) of a second size different from the first size.

According to various embodiments, the first size of the first opening disposed close to the display may be smaller than the second size.

According to various embodiments, at least a portion of the sensor may be disposed in the second opening.

According to various embodiments, the back panel may include at least one of a cushion layer (392), a heat radiation layer (395), and a digitizer (394).

According to various embodiments, the first adhesive member may include an adhesive tape.

According to various embodiments, the second adhesive member may include a liquid-type adhesive material.

According to various embodiments, the second adhesive member may include a material that is a liquid-type adhesive material and is solidified through additional processing.

According to various embodiments, a step space (318a or 318b) may be formed at a portion of the support member, which surrounds the sensor hole.

According to various embodiments, the first adhesive member may be disposed in the step space.

According to various embodiments, the electronic device may further include a wire part (365) that is electrically connected with the sensor.

According to various embodiments, the support member may further include a wire hole (317), and the wire part may pass through the wire hole.

According to various embodiments, the electronic device may further include a battery (350) that is disposed below the sensor.

Figure 15:
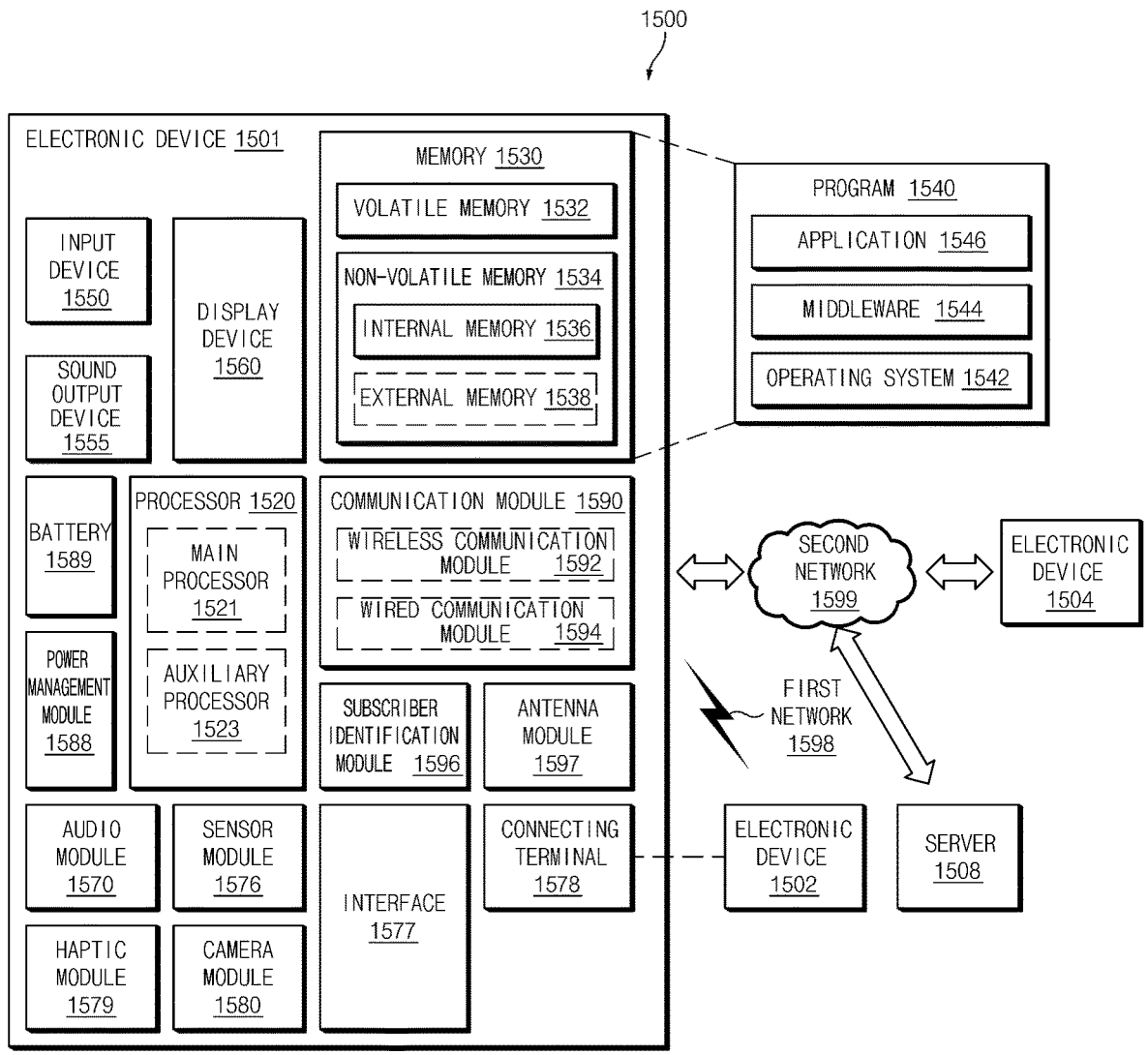
FIG. 15 is a block diagram of an electronic device in a network environment, according to various embodiments.

FIG. 15 is a block diagram of an electronic device 1501 in a network environment 1500 according to various embodiments. Referring to FIG. 15, the electronic device 1501 (e.g., the electronic device 100 in FIG. 1) may communicate with an electronic device 1502 through a first network 1598 (e.g., a short-range wireless communication network) or may communicate with an electronic device 1504 or a server 1508 through a second network 1599 (e.g., a long-distance wireless communication network) in the network environment 1500. According to an embodiment, the electronic device 1501 may communicate with the electronic device 1504 through the server 1508. According to an embodiment, the electronic device 1501 may include a processor 1520, a memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module 1596, or an antenna module 1597. According to some embodiments, at least one (e.g., the display device 1560 or the camera module 1580) among components of the electronic device 1501 may be omitted or one or more other components may be added to the electronic device 1501. According to some embodiments, some of the above components may be implemented with one integrated circuit. For example, the sensor module 1576 (e.g., a fingerprint sensor, an iris sensor, or an illuminance sensor) may be embedded in the display device 1560 (e.g., a display).

The processor 1520 may execute, for example, software (e.g., a program 1540) to control at least one of other components (e.g., a hardware or software component) of the electronic device 1501 connected to the processor 1520 and may process or compute a variety of data. According to an embodiment, as a part of data processing or operation, the processor 1520 may load a command set or data, which is received from other components (e.g., the sensor module 1576 or the communication module 1590), into a volatile memory 1532, may process the command or data loaded into the volatile memory 1532, and may store result data into a nonvolatile memory 1534. According to an embodiment, the processor 1520 may include a main processor 1521 (e.g., a central processing unit or an application processor) and an auxiliary processor 1523 (e.g., a graphic processing device, an image signal processor, a sensor hub processor, or a communication processor), which operates independently from the main processor 1521 or with the main processor 1521. Additionally or alternatively, the auxiliary processor 1523 may use less power than the main processor 1521, or is specified to a designated function. The auxiliary processor 1523 may be implemented separately from the main processor 1521 or as a part thereof.

The auxiliary processor 1523 may control, for example, at least some of functions or states associated with at least one component (e.g., the display device 1560, the sensor module 1576, or the communication module 1590) among the components of the electronic device 1501 instead of the main processor 1521 while the main processor 1521 is in an inactive (e.g., sleep) state or together with the main processor 1521 while the main processor 1521 is in an active (e.g., an application execution) state. According to an embodiment, the auxiliary processor 1523 (e.g., the image signal processor or the communication processor) may be implemented as a part of another component (e.g., the camera module 1580 or the communication module 1590) that is functionally related to the auxiliary processor 1523.

The memory 1530 may store a variety of data used by at least one component (e.g., the processor 1520 or the sensor module 1576) of the electronic device 1501. For example, data may include software (e.g., the program 1540) and input data or output data with respect to commands associated with the software. The memory 1530 may include the volatile memory 1532 or the nonvolatile memory 1534.

The program 1540 may be stored in the memory 1530 as software and may include, for example, an operating system 1542, a middleware 1544, or an application 1546.

The input device 1550 may receive a command or data, which is used for a component (e.g., the processor 1520) of the electronic device 1501, from outside (e.g., from a user) of the electronic device 1501. The input device 1550 may include, for example, a microphone, a mouse, a keyboard, or a digital pen (e.g., a stylus pen).

The sound output device 1555 may output a sound signal to the outside of the electronic device 1501. The sound output device 1555 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 1560 may visually provide information to the outside (e.g., the user) of the electronic device 1501. For example, the display device 1560 may include a display, a hologram device, or a projector and a control circuit for controlling a corresponding device. According to an embodiment, the display device 1560 may include touch circuitry configured to sense a touch or a sensor circuit (e.g., a pressure sensor) for measuring an intensity of pressure on a touch.

The audio module 1570 may convert a sound and an electrical signal in dual directions. According to an embodiment, the audio module 1570 may obtain the sound through the input device 1550 or may output the sound through the sound output device 1555 or an external electronic device (e.g., the electronic device 1502 (e.g., a speaker or a headphone)) directly or wirelessly connected to the electronic device 1501.

The sensor module 1576 may generate an electrical signal or a data value corresponding to an operating state (e.g., power or temperature) inside or an environmental state (e.g., a user state) outside the electronic device 1501. According to an embodiment, the sensor module 1576 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more designated protocols to allow the electronic device 1501 to connect directly or wirelessly to the external electronic device (e.g., the electronic device 1502). According to an embodiment, the interface 1577 may include, for example, a high-definition multimedia interface (HDMI), a universal serial bus (USB) interface, an SD card interface, or an audio interface.

A connecting terminal 1578 may include a connector that physically connects the electronic device 1501 to the external electronic device (e.g., the electronic device 1502). According to an embodiment, the connecting terminal 1578 may include, for example, an HDMI connector, a USB connector, an SD card connector, or an audio connector (e.g., a headphone connector).

The haptic module 1579 may convert an electrical signal to a mechanical stimulation (e.g., vibration or movement) or an electrical stimulation perceived by the user through tactile or kinesthetic sensations. According to an embodiment, the haptic module 1579 may include, for example, a motor, a piezoelectric element, or an electric stimulator.

The camera module 1580 may shoot a still image or a video image. According to an embodiment, the camera module 1580 may include, for example, at least one or more lenses, image sensors, image signal processors, or flashes.

The power management module 1588 may manage power supplied to the electronic device 1501. According to an embodiment, the power management module 1588 may be implemented as at least a part of a power management integrated circuit (PMIC).

The battery 1589 may supply power to at least one component of the electronic device 1501. According to an embodiment, the battery 1589 may include, for example, a non-rechargeable (primary) battery, a rechargeable (secondary) battery, or a fuel cell.

The communication module 1590 may establish a direct (e.g., wired) or wireless communication channel between the electronic device 1501 and the external electronic device (e.g., the electronic device 1502, the electronic device 1504, or the server 1508) and support communication execution through the established communication channel. The communication module 1590 may include at least one communication processor operating independently from the processor 1520 (e.g., the application processor) and supporting the direct (e.g., wired) communication or the wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication module). The corresponding communication module among the above communication modules may communicate with the external electronic device through the first network 1598 (e.g., the short-range communication network such as a Bluetooth, a Wi-Fi direct, or an infrared data association (IrDA)) or the second network 1599 (e.g., the long-distance wireless communication network such as a cellular network, an internet, or a computer network (e.g., LAN or WAN)). The above-mentioned various communication modules may be implemented into one component (e.g., a single chip) or into separate components (e.g., a plurality of chips), respectively. The wireless communication module 1592 may identify and authenticate the electronic device 1501 using user information (e.g., international mobile subscriber identity (IMSI)) stored in the subscriber identification module 1596 in the communication network, such as the first network 1598 or the second network 1599.

The antenna module 1597 may transmit or receive a signal or power to or from the outside (e.g., an external electronic device). According to an embodiment, the antenna module 1597 may be formed of a conductor or a conductive pattern. According to an embodiment, the antenna module 1597 may further include any other component (e.g., an RFIC) in addition to a conductor or a conductive pattern. According to an embodiment, the antenna module 1597 may include one or more antennas. For example, the communication module 1590 may select one antenna suitable for a communication method used in the communication network such as the first network 1598 or the second network 1599. The signal or power may be transmitted or received between the communication module 1590 and the external electronic device through the selected one or more antenna.

At least some components among the components may be connected to each other through a communication method (e.g., a bus, a general purpose input and output (GPIO), a serial peripheral interface (SPI), or a mobile industry processor interface (MIPI)) used between peripheral devices to exchange signals (e.g., a command or data) with each other.

According to an embodiment, the command or data may be transmitted or received between the electronic device 1501 and the external electronic device 1504 through the server 1508 connected to the second network 1599. Each of the electronic devices 1502 and 1504 may be the same or different types as or from the electronic device 1501. According to an embodiment, all or some of the operations performed by the electronic device 1501 may be performed by one or more external electronic devices among the external electronic devices 1502, 1504, or 1508. For example, when the electronic device 1501 performs some functions or services automatically or by request from a user or another device, the electronic device 1501 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 1501. The electronic device 1501 may provide the result as is or after additional processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components (or from another component), but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly, via wire), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 1540) including one or more instructions stored in a machine-readable storage medium (e.g., an internal memory 1536 or an external memory 1538) readable by a machine (e.g., the electronic device 1501). For example, the processor (e.g., the processor 1520) of a machine (e.g., the electronic device 1501) may call at least one instruction of the one or more instructions stored in the storage medium from the machine-readable storage medium and execute the one or more instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

According to various embodiments, an electronic device including a sensor disposed below a display may provide a stable, highly reliable result in operating the sensor by disposing the sensor accurately and stably at a necessary location.

Also, the electronic device according to various embodiments may maintain a slim shape by minimizing an increase in thickness according to sensor placement even though the sensor is disposed below the display.

Various purposes and effects that the electronic device according to various embodiments provides will be mentioned for each embodiment of the detailed description.

While the disclosure has been shown and described with reference to various embodiments thereof, it will be understood by those skilled in the art that various changes in form and details may be made therein without departing from the spirit and scope of the disclosure as defined by the appended claims and their equivalents.

The scope of protection is defined by the appended independent claims. Further features are specified by the appended dependent claims. Example implementations can be realized comprising one or more features of any claim taken jointly and severally in any and all permutations.

The examples described in this disclosure include non-limiting example implementations of components corresponding to one or more features specified by the appended independent claims and these features (or their corresponding components) either individually or in combination may contribute to ameliorating one or more technical problems deducible by the skilled person from this disclosure.

Furthermore, one or more selected component of any one example described in this disclosure may be combined with one or more selected component of any other one or more example described in this disclosure, or alternatively may be combined with features of an appended independent claim to form a further alternative example.

Further example implementations can be realized comprising one or more components of any herein described implementation taken jointly and severally in any and all permutations. Yet further example implementations may also be realized by combining features of one or more of the appended claims with one or more selected components of any example implementation described herein.

In forming such further example implementations, some components of any example implementation described in this disclosure may be omitted. The one or more components that may be omitted are those components that the skilled person would directly and unambiguously recognize as being not, as such, indispensable for the function of the present technique in the light of a technical problem discernible from this disclosure. The skilled person would recognize that replacement or removal of such an omitted components does not require modification of other components or features of the further alternative example to compensate for the change. Thus further example implementations may be included, according to the present technique, even if the selected combination of features and/or components is not specifically recited in this disclosure.

Two or more physically distinct components in any described example implementation of this disclosure may alternatively be integrated into a single component where possible, provided that the same function is performed by the single component thus formed. Conversely, a single component of any example implementation described in this disclosure may alternatively be implemented as two or more distinct components to achieve the same function, where appropriate.

What is claimed is:

1. A portable communication device comprising:
a display;
a back panel disposed below the display, the back panel including a first opening;
a support disposed below the back panel, the support including a second opening that at least partially overlaps with the first opening, wherein the second opening includes a first portion having a first width, and a second portion provided below the first portion and having a second width greater than the first width;
a sensor disposed in the first portion of the second opening and configured to receive light reflected by a portion of a user's body and passing through the display and the first opening of the back panel; and
a substrate coupled to the sensor and disposed in the second portion of the second opening.

2. The portable communication device of claim 1, wherein the sensor is coupled to the substrate by an adhesive.

3. The portable communication device of claim 1, further comprising a gap formed between an inner side wall of the first portion and the sensor,
wherein the gap is filled with an adhesive.

4. The portable communication device of claim 1, further comprising a battery disposed below the support,
wherein at least portion of the battery is attached to at least portion of the support by an adhesive film or tape.

5. The portable communication device of claim 1, further comprising an adhesive film disposed between the support and the substrate,
wherein the adhesive film is arranged to attach at least a portion of the substrate to the support.

6. The portable communication device of claim 1, wherein at least a portion of a lower surface of the substrate is above at least a portion of a lower surface of the support.

7. The portable communication device of claim 1, wherein at least a portion of a lower surface of the substrate is disposed on a plane substantially identical to a lower surface of the support.

8. The portable communication device of claim 1, further comprising: an adhesive disposed in at least a portion of a region between the support and the substrate to adhere the substrate to the support, wherein at least a portion of the adhesive is disposed in the second portion of the second opening.

9. The portable communication device of claim 1, further comprising:
a battery disposed below the support and the substrate.

10. The portable communication device of claim 9, further comprising:
an adhesive disposed in at least a portion of a region between the support and the battery to adhere at least a portion of the battery to the support.

11. The portable communication device of claim 1, further comprising:
a housing defining an exterior of the portable communication device, wherein the support is integrally connected with the housing.

12. The portable communication device of claim 11, further comprising:
a communication circuit electrically connected with a conductive portion included in the housing.

13. The portable communication device of claim 1, further comprising:
a processor electrically connected with the sensor;
a printed circuit board disposed to be spaced from the sensor,
wherein the processor is mounted on the printed circuit board; and
a wire including one side connected with the sensor and an opposite side connected with the processor through the printed circuit board.

14. The portable communication device of claim 13, wherein the support further includes:
a wire hole,
wherein at least a portion of the wire passes through the wire hole.

15. The portable communication device of claim 1, wherein the support comprises a conductive material.

16. The portable communication device of claim 1, wherein the back panel comprises a plurality of layers, and
wherein the plurality of layers includes at least two of: an embossed layer, a cushion layer, an electromagnetic induction layer, a heat radiation layer, a shielding layer, and an adhesive layer.

17. The portable communication device of claim 1, wherein the back panel comprises at least one layer.

18. The portable communication device of claim 1, wherein the back panel comprises a plurality of layers.

19. The portable communication device of claim 1, wherein the first opening is stepped and comprises an upper portion and a lower portion, the lower portion being wider than the upper portion.

20. The portable communication device of claim 1, wherein the second opening is stepped, widening from the first portion to the second portion at a step, the step providing a downward facing flat surface surrounding a lower mouth of the first portion.

21. The portable communication device of claim 20, wherein at least part of an upper surface of the substrate is seated on the flat surface.

22. The portable communication device of claim 21, further comprising adhesive arranged to attach at least a portion of an upper surface of the substrate to at least a portion of the flat surface.

23. The portable communication device of claim 22, wherein the adhesive comprises adhesive tape.

24. The portable communication device of claim 1, wherein the substrate comprises a metal sheet.

25. The portable communication device of claim 1, wherein the substrate is rectangular.

26. The portable communication device of claim 25, wherein the second portion is rectangular.

27. The portable communication device of claim 1, wherein the first portion is rectangular.

28. The portable communication device of claim 1, wherein the sensor is an optical fingerprint sensor.

* * * * *